US010474962B2

(12) United States Patent
Hakkani-Tur et al.

(10) Patent No.: US 10,474,962 B2
(45) Date of Patent: Nov. 12, 2019

(54) SEMANTIC ENTITY RELATION DETECTION CLASSIFIER TRAINING

(71) Applicant: Microsoft Technology Licensing, LLC, Redmond, WA (US)

(72) Inventors: Dilek Hakkani-Tur, Kirkland, WA (US); Panupong Pasupat, Stanford, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 497 days.

(21) Appl. No.: 14/846,343

(22) Filed: Sep. 4, 2015

(65) Prior Publication Data

US 2017/0068903 A1    Mar. 9, 2017

(51) Int. Cl.
  *G06N 99/00* (2019.01)
  *G06N 20/00* (2019.01)
  *G06N 5/02* (2006.01)
(52) U.S. Cl.
  CPC ............ *G06N 20/00* (2019.01); *G06N 5/022* (2013.01); *G06N 99/00* (2013.01)
(58) Field of Classification Search
  None
  See application file for complete search history.

(56) References Cited

U.S. PATENT DOCUMENTS

| | | |
|---|---|---|
| 2002/0169596 A1 | 11/2002 | Brill et al. |
| 2009/0198493 A1 | 8/2009 | Hakkani-Tur et al. |
| 2009/0254344 A1 | 10/2009 | Hakkani-Tur et al. |
| 2010/0023331 A1 | 1/2010 | Duta et al. |
| 2010/0145678 A1 | 6/2010 | Csomai et al. |
| 2014/0236570 A1 | 8/2014 | Heck et al. |
| 2014/0309993 A1 | 10/2014 | Goussard |
| 2015/0149176 A1 | 5/2015 | Giulianelli et al. |

OTHER PUBLICATIONS

Pasupat, et al., Unsupervised Relation Detection using Automatic Alignment of Query Patterns Extracted from Knowledge Graphs and Query Click Logs, INTERSPEECH-2015, 2015, pp. 2714-2718.*

(Continued)

*Primary Examiner* — Wilbert L Starks
(74) *Attorney, Agent, or Firm* — Alleman Hall Creasman & Tuttle LLP

(57) ABSTRACT

Semantic entity relation detection classifier training implementations are presented that are generally used to train a semantic entity relation detection classifier to identify relations expressed in a natural language query. In one general implementation, queries are found in a search query click log that exhibit relations and entity types found in a semantic knowledge graph. Explicit relations are inferred from the found queries and an explicit relations data set is generated that includes queries associated with the inferred explicit relations. In addition, implicit relations are inferred from the found queries and an implicit relations data set is generated that includes queries associated with the inferred implicit relations. A semantic entity relation detection classifier is then trained using the explicit and implicit data sets.

20 Claims, 22 Drawing Sheets

(56) References Cited

OTHER PUBLICATIONS

Pasupat, et al., Unsupervised Relation Detection using Automatic Alignment of Query Patterns Extracted from Knowledge Graphs and Query Click Logs, INTERSPEECH-2015, 2015, pp. 2714-2718 (Year: 2015).*

Baeza-Yates, et al., "Query Recommendation using Query Logs in Search Engines", In Proceedings of the 9th International Conference on Extending Database Technology, Mar. 14, 2004, 11 pages.

Berant, et al., "Semantic Parsing on Freebase from Question Answer Pairs", In Proceedings of the Conference on Empirical Methods in Natural Language Processing, Oct. 18, 2013, 12 pages.

Bollacker, et al., "Freebase: A Collaboratively Created Graph Database for Structuring Human Knowledge", In proceedings of the ACM SIGMOD international conference on Management of data, Jun. 9, 2008, pp. 1247-1249.

Cai, et al., "Large-Scale Semantic Parsing via Schema Matching and Lexicon Extension", In Proceedings of the 51st Annual Meeting of the Association for Computational Linguistics, Aug. 4, 2013, 11 pages.

Celikyilmaz, et al., "IsNL? A Discriminative Approach to Detect Natural Language Like Queries for Conversational Understanding", In Proceeding 14th Annual Conference of the International Speech Communication Association, Aug. 25, 2013, pp. 2569-2573.

Celikyilmaz, et al., "Leveraging Web Query Logs to Learn User Intent Via Bayesian Discrete Latent Variable Model", In Proceedings of the 28th International Conference on Machine Learning, Jun. 28, 2011, 6 pages.

"Chen, ""Deriving Local Relational Surface Forms from Dependency-Based Entity Embeddingsfor Unsupervised Spoken Language Understanding"", In Proceedings of IEEE Spoken Language Technology Workshop, Dec. 7, 2014, 5 pages."

Chen, et al., "Unsupervised Induction and filling of Semantic Slots for Spoken Dialogue Systems using Frame-Semantic Parsing", In Proceedings of IEEE Workshop on Automatic Speech Recognition and Understanding, Dec. 8, 2013, pp. 120-125.

Chen, Yun-Hung (Vivian)., "Unsupervised Learning and Modeling of Knowledge and Intent for Spoken Dialogue Systems", In Ph.D. Thesis Proposal, Apr. 2015, 102 pages.

Chotimongkol, et al., "Automatic Concept Identification in Goal Oriented Conversations", In Proceedings of 7th International Conference on Spoken Language Processing, Sep. 16, 2002, 5 pages.

Craswell, et al., "Random Walks on the Click Graph", In Proceedings of the 30th annual international ACM SIGIR conference on Research and development in information retrieval, Jul. 23, 2007, pp. 239-246.

Cui, et al., "Probabilistic Query Expansion using Query Logs", In Proceedings of the 11th International Conference on World Wide Web, May 7, 2002, pp. 325-332.

El-Kahky, et al., "Extending Domain Coverage of Language Understanding Systems via Intent Transfer between Domains Using Knowledge Graphs and Search Query Click Logs", In Proceedings of IEEE International Conference on Acoustics, Speech and Signal Processing, May 4, 2014, pp. 4087-4091.

Freitas, et al., "Relation Detection between named Entities: Report of a Shared Task", In Proceedings of the NAACL HLT Workshop on Semantic Evaluations: Recent Achievements and Future Directions, Jun. 2009, pp. 129-137.

Hakkani-Tur, "Probabilistic Enrichment of Knowledge Graph Entities for Relation Detection in Conversational Understanding", In Proceedings of 15th Annual Conference of the International Speech Communication Association, Sep. 14, 2014, pp. 2113-2117.

Hakkani-Tur, et al, "Exploiting Query Click Logs for Utterance Domain Detection in Spoken Language Understanding", In Proceedings of IEEE International Conference on Acoustics, Speech and Signal Processing, May 22, 2011, pp. 5636-5639.

Hakkani-Tür, et al., "Mining Search Query Logs for Spoken Language Understanding", In Proceedings of NAACL-HLT Workshop on Future Directions and Needs in the Spoken Dialog Community: Tools and Data, Jun. 7, 2012; pp. 37-40.

Heck, et al., "Leveraging Knowledge Graphs for Web-Scale Unsupervised Semantic Parsing", In Proceedings of 14th Annual Conference of the International Speech Communication Association, Aug. 25, 2013, pp. 1594-1598.

Hoffmann, et al., "Knowledge-Based Weak Supervision for Information Extraction of Overlapping Relations", In Proceedings of the 49th Annual Meeting of the Association for Computational Linguistics: Human Language Technologies—vol. 1, Jun. 19, 2011, pp. 541-550.

Jain, et al., "Open Entity Extraction fromWeb Search Query Logs", In Proceedings of the 23rd International Conference on Computational Linguistics, Aug. 2010, pp. 510-518.

Joachims Thorsten, "Optimizing Search Engines using Clickthrough Data", In Proceedings of the eighth ACM SIGKDD International Conference on Knowledge Discovery and Data Mining, Jul. 23, 2002, pp. 133-142.

Komachi, et al., "Minimally Supervised Learning of Semantic Knowledge from Query Logs", In Proceedings of the Third International Joint Conference on Natural Language Processing, Jan. 7, 2008, pp. 358-365.

Liu, et al., "Automatic Query Type Identification Based on Click Through Information", In Proceedings of Third Asia Information Retrieval Symposium, Oct. 16, 2006. pp. 593-600.

Liu, et al., "Lexicon Modeling for Query Understanding", In Proceedings of IEEE International Conference on Acoustics, Speech and Signal Processing, May 22, 2011, pp. 5604-5607.

Mintz, et al., "Distant Supervision for Relation Extraction without Labeled Data", In Proceedings of the 47th Annual Meeting of the ACL and the 4th IJCNLP of the AFNLP, Aug. 2, 2009, pp. 1003-1011.

Pantel, et al., "Mining Entity Types from Query Logs via User Intent Modeling", In Proceedings of the 50th Annual Meeting of the Association for Computational Linguistics, Jul. 8, 2012, pp. 563-571.

Pasca, Marius, "Queries as a Source of Lexicalized Commonsense Knowledge", In Proceedings of the Conference on Empirical Methods in Natural Language Processing, Oct. 25, 2014, pp. 1081-1091.

Pound, et al., "Interpreting Keyword Queries over Web Knowledge Bases", In Proceedings of the 21st ACM international conference on Information and knowledge management, Oct. 29, 2012, 10 pages.

Price, P. J., "Evaluation of Spoken Language Systems: The ATIS domain", In Proceedings of the workshop on Speech and Natural Language, Jun. 24, 1990, pp. 91-95.

Riedel, et al., "Modeling Relations and their Mentions without Labeled Text", In Proceedings of the European conference on Machine learning and knowledge discovery in databases: Part II, Sep. 20, 2010, 16 pages.

Sekine, et al., "Acquiring Ontological Knowledge from Query Logs", In Proceedings of the 16th International Conference on World Wide Web, May 8, 2007, pp. 1223-1224.

Tur, et al, "Towards Unsupervised Spoken Language Understanding: Exploiting Query Click Logs for Slot Filling", In Proceedings of 12th Annual Conference of the International Speech Communication Association, Aug. 27, 2011, pp. 1293-1296.

Tur, et al., "Combining active and semi-supervised learning for spoken language understanding", In Proceedings of Speech Communication, vol. 45, No. 2, Feb. 2005, pp. 171-186.

Tur, et al., "Exploiting Semantic Web for Unsupervised Statistical Natural Language Semantic Parsing ", In Proceedings of 13th Annual Conference of the International Speech Communication Association, Sep. 9, 2012, 4 pages.

Tur, et al., "Semi-Supervised Learning for Spoken Language Understanding using Semantic Role Labeling", In Proceedings of IEEE Workshop on Automatic Speech Recognition and Understanding, Nov. 27, 2005, pp. 232-237.

Tur, et al., "Using a Knowledge Graph and Query Click Logs for Unsupervised Learning of Relation Detection", In Proceedings of IEEE International Conference on Acoustics, Speech, and Signal Processing, May 26, 2013, pp. 8327-8331.

(56) References Cited

OTHER PUBLICATIONS

Wang, et al., "An Introduction to Statistical Spoken Language Understanding", In IEEE Signal Processing Magazine, vol. 22, No. 5, Sep. 2005, 36 pages.

Wang, et al., "Discriminative Models for Spoken Language Understanding", In Proceedings of Ninth International Conference on Spoken Language Processing, Sep. 17, 2006, pp. 1766-1769.

Williams, et al., "Rapidly scaling dialog systems with Interactive Learning", In Proceedings of International Workshop Series on Spoken Dialogue Systems Technology, Jan. 11, 2015, 12 pages.

Yao, et al., "Information Extraction over Structured Data: Question Answering with Freebase", In Proceedings of the 52nd Annual Meeting of the Association for Computational Linguistics, Jun. 22, 2014, 11 pages.

\* cited by examiner

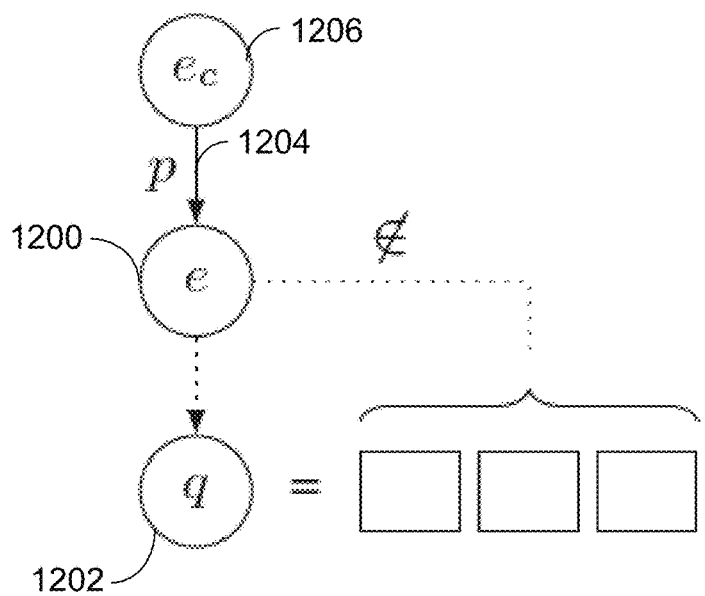

FIG. 12

| movie type | actor |
|---|---|
| [actor] and [actor] movie<br>who played [character] in [film]<br>[film] [profession]<br>[actor] as [character] | [profession] in [film]<br>[character] from [film]<br>who played [character]<br>cast of [film] |
| director | character |
| director of [film]<br>who directed [film]<br>[film] the movie<br>[film] director | characters in [film]<br>[actor] in [film]<br>girl from [film]<br>the cast of [film] |

FIG. 17

SEMANTIC ENTITY RELATION DETECTION CLASSIFIER TRAINING

BACKGROUND

Spoken language understanding (SLU) is an emerging field that resides in-between the fields of speech processing and natural language processing. SLU has a vast array of applications in both the areas of natural human-to-machine communication and human-to-human communication. Examples of such applications include various enterprise applications (e.g., automated customer-care centers and meeting summarization) and various consumer applications (e.g., speech summarization, voice search, spoken document retrieval, and more complex voice interaction with mobile and other types of computing devices, automobiles, robots, and smart home environments). Simply put, SLU in today's human-to-machine spoken dialog systems (also known as conversational interaction systems and conversational understanding systems) aims to extract "meaning" from conversational speech. In other words, SLU in today's human-to-machine spoken dialog systems generally attempts to obtain a conceptual representation (e.g., an understanding of the meaning) of naturally spoken language by leveraging various technologies such as signal processing, pattern recognition, machine learning, and artificial intelligence.

In one particular implementation a dialog system, a SLU module receives transcribed speech queries and extracts their semantic information, which can be used for decision making and response generation. As part of this extraction process it is advantageous to know the relations expressed in the query (e.g., "Who played Jake Sully in Avatar" has relations acted by, character name, and movie name). These relations can be used in one example to form queries to databases or knowledge graphs in order to generate an appropriate response.

SUMMARY

Semantic entity relation detection classifier implementations described herein generally involve a system for training a semantic entity relation detection classifier that finds relations in a query. In one exemplary implementation one or more computing devices run a computer program having program modules that direct the computing device or devices to first receive a query click log and a knowledge graph. Queries included in the query click log that are associated with entities found in the knowledge graph are then found. These entities are ones associated with a knowledge graph domain of interest. Explicit relations are inferred from the found queries and an explicit relations data set is generated that includes queries associated with the inferred explicit relations. In addition, implicit relations are inferred from the found queries and an implicit relations data set is generated that includes queries associated with the inferred implicit relations. A semantic entity relation detection classifier is then trained using the explicit and implicit data sets.

It should be noted that the foregoing Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter. Its sole purpose is to present some concepts of the claimed subject matter in a simplified form as a prelude to the more detailed description that is presented below.

DESCRIPTION OF THE DRAWINGS

The specific features, aspects, and advantages of the disclosure will become better understood with regard to the following description, appended claims, and accompanying drawings where:

FIG. 12 is a diagram illustrating one implementation, in simplified form, for inferring an implicit relation in a query.

FIG. 17 is a table listing several examples of query patterns derived from an implicit relation dataset.

DETAILED DESCRIPTION

Figure 1:
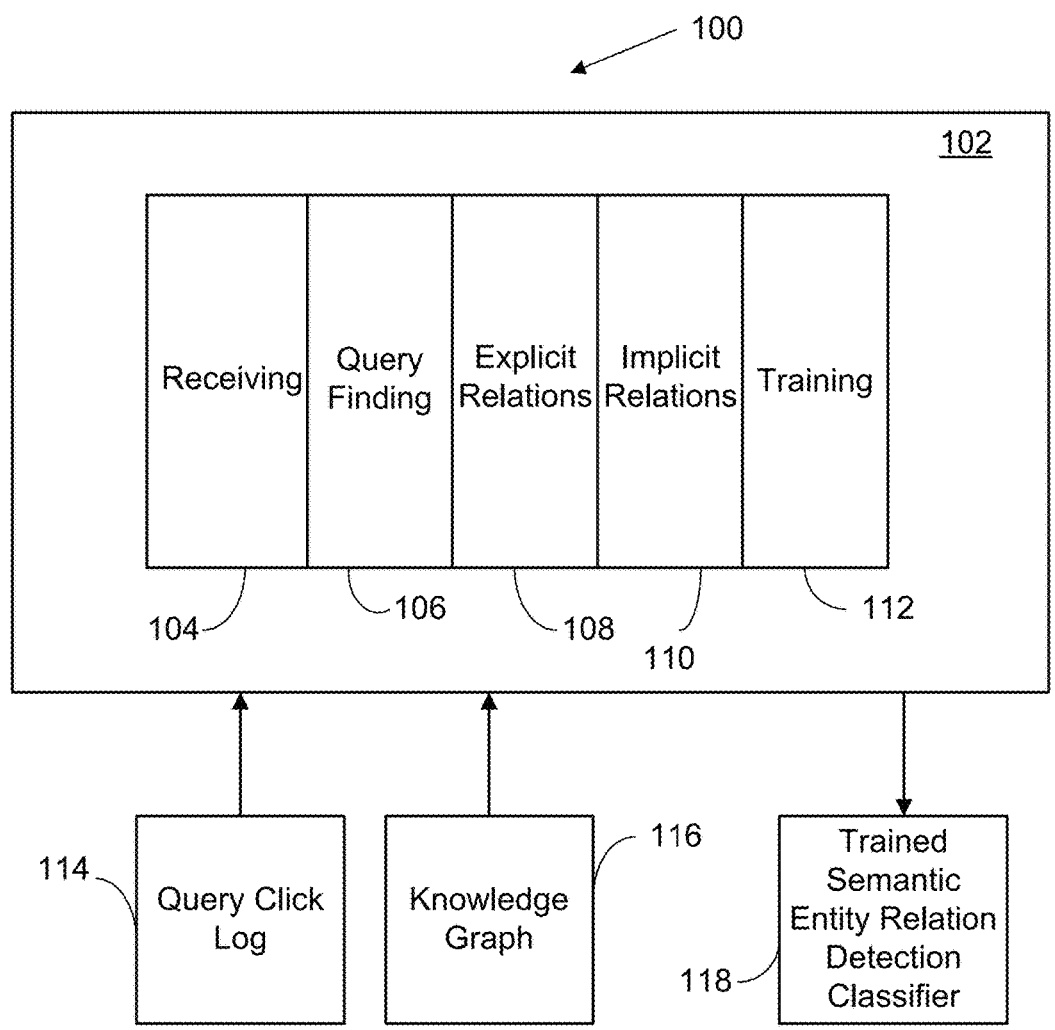
FIG. 1 is a diagram illustrating one implementation, in simplified form, of a system framework used in training a semantic entity relation detection classifier.

In the following description reference is made to the accompanying drawings which form a part hereof, and in which are shown, by way of illustration, specific versions in which semantic entity relation detection classifier training implementations can be practiced. It is understood that other implementations can be utilized and structural changes can be made without departing from the scope thereof.

It is also noted that for the sake of clarity specific terminology will be resorted to in describing the semantic entity relation detection classifier training implementations and it is not intended for these implementations to be limited to the specific terms so chosen. Furthermore, it is to be understood that each specific term includes all its technical equivalents that operate in a broadly similar manner to achieve a similar purpose. Reference herein to "one implementation", or "another implementation", or an "exemplary implementation", or an "alternate implementation" means that a particular feature, a particular structure, or particular characteristics described in connection with the implementation can be included in at least one version of the semantic entity relation detection classifier training. The appearances of the phrases "in one implementation", "in another implementation", "in an exemplary implementation", and "in an alternate implementation" in various places in the specification are not necessarily all referring to the same implementation, nor are separate or alternative implementations mutually exclusive of other implementations. Yet furthermore, the order of process flow representing one or more implementations of the project information extraction does not inherently indicate any particular order or imply any limitations thereof.

As utilized herein, the terms "component," "system," "client" and the like are intended to refer to a computer-related entity, either hardware, software (e.g., in execution), firmware, or a combination thereof. For example, a component can be a process running on a processor, an object, an executable, a program, a function, a library, a subroutine, a computer, or a combination of software and hardware. By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, to the extent that the terms "includes," "including," "has," "contains," and variants thereof, and other similar words are used in either this detailed description or the claims, these terms are intended to be inclusive in a manner similar to the term "comprising" as an open transition word without precluding any additional or other elements.

1.0 Semantic Entity Relation Detection Classifier Training

The semantic entity relation detection classifier training implementations described herein are used to train a semantic entity relation detection classifier to identify relations expressed in a natural language query. For example, the queries "Show me movies by James Cameron" and "Who directed Avatar" both contain the relation directed by, which can be identified using a semantic entity relation detection classifier trained using the training implementations described herein. In the foregoing example, the terms "movies", "James Cameron" and "Avatar" are entities. In general, entities are things that include a wide variety of characteristics, preferences, or other attributes relating to persons, pets, artifacts, etc. A relation generally describes a relationship among entities or about entities. Various conventional entity and relation types have been established that categorize an entity or relation. For example, the terms "movie" and "Avatar" would fall into the film entity type; the term "James Cameron" would fall into the film director entity type, and as indicated previously a relation exists between these entities that falls into the directed by relation type.

In general, the semantic entity relation detection classifier training implementations described herein use queries found in a search query click log that exhibit relations and entity types found in a semantic knowledge graph. As will be appreciated from the more detailed description that follows, a knowledge graph is a representation of entities and the relations between them, and a query click log is a record of web search queries made by users that include the uniform resource locator (URL) associated with a result presented to the user in response to a search based on the query that a user chose.

The foregoing use of a knowledge graph and a query click log is advantageous in that as few as one knowledge graph entity can be utilized for finding relevant query patterns from query click logs. These patterns can be used to infer both explicit relations (where the objects of the relations are expressed in the queries such as the directed by relation in "Find Avatar movie directed by James Cameron") and implicit relations (where the objects of the relations are being asked about such as the directed by relation in "Who made Avatar").

Identifying the relation or relations that exist in a query is quite useful as will be appreciated from the more detailed description that follows. For example, such relations can be regarded as building blocks toward full language understanding, since more complex representations of a query, such as SPARQL knowledge graph queries or semantic logical forms, will contain relations. Relations can also be utilized in downstream tasks such as answering factoid questions.

It is noted that the semantic entity relation detection classifier training implementations described herein can be realized in various ways. By way of example but not limitation, these implementations can be integrated directly into a given spoken dialog application or web search application, among other types of applications. These implementations can also be realized as a cloud service. The term "cloud service" is used herein to refer to a web application that operates in the cloud, and can be hosted on (e.g., deployed at) one or more computing devices which may be located in different geographic regions (e.g., different regions of the world), and can be concurrently utilized by a plurality of remote client computing devices each of which executes one or more spoken dialog applications.

FIG. 1 illustrates an exemplary implementation, in simplified form, of a system framework used in training a semantic entity relation detection classifier which in turn can be used to determine (e.g., infer) semantic entity relations in natural language queries that are input to the classifier. As exemplified in FIG. 1, the system framework 100 includes a computer program 102 having program modules executable by one or more computing devices. These program modules include a receiving module 104, a query finding module 106, an explicit relations module 108, an implicit relations module 110, and a training module 112. A query click log 114 and a knowledge graph 116 are input to the receiving module 104, and a trained semantic entity relation detection classifier 118 is output from the training module 112. Each of these program modules is realized on one or more computing devices such as that described in more detail in the Exemplary Operating Environments section which follows. It is noted that whenever there is a plurality of computing devices they are in communication with each other via a computer network (such as the Internet or a proprietary intranet).

Figure 2:
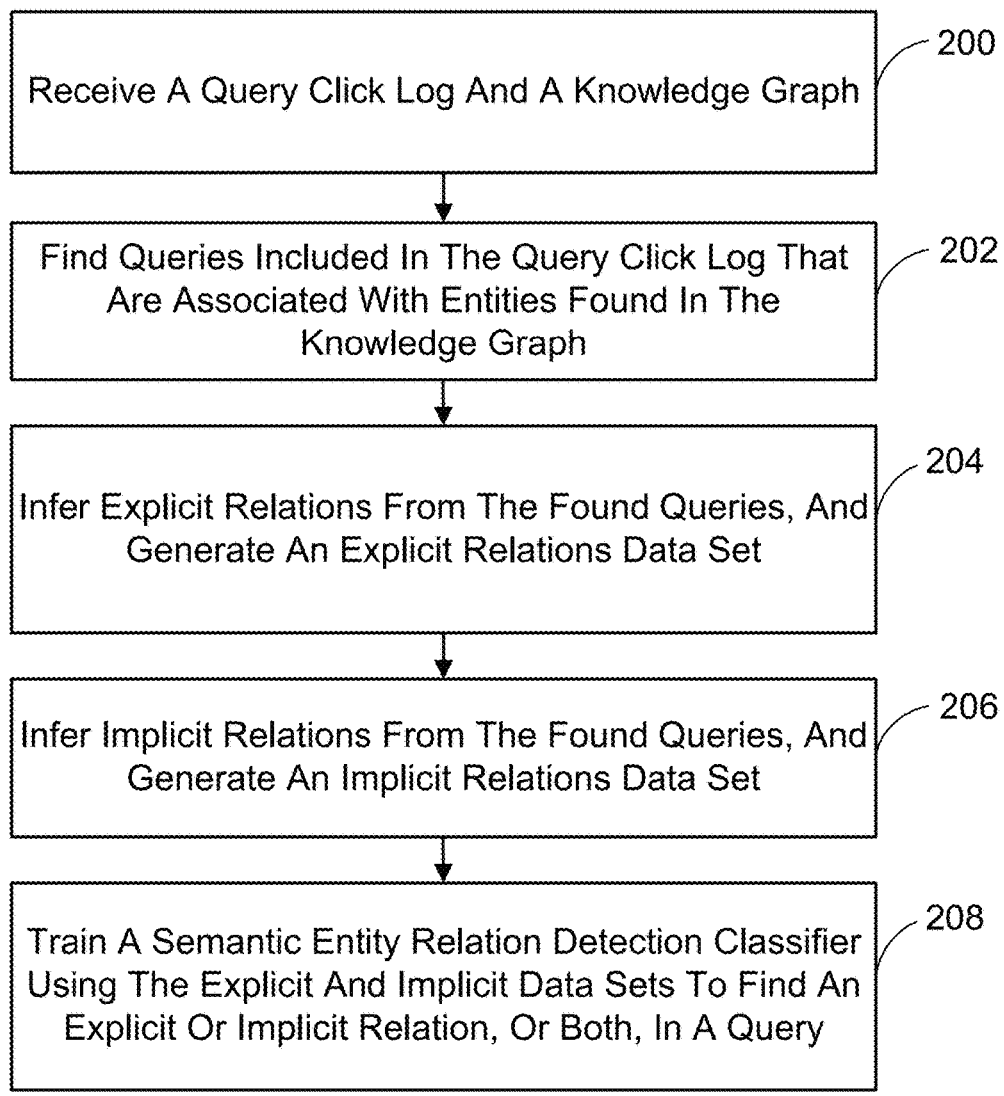
FIG. 2 is a flow diagram illustrating one implementation, in simplified form, of a process for training a semantic entity relation detection classifier.

Referring now to FIG. 2, the aforementioned one or more computing devices are directed by the foregoing program modules of the computer program to accomplish a series of process actions. More particularly, a query click log and a knowledge graph are received via the receiving module (process action 200). Queries included in the query click log are then found using the query finding module that are associated with entities found in the knowledge graph (process action 202). These entities are associated with one of the knowledge graph's domains that are of interest. In general, a knowledge graph has a pre-established set of domains. By way of example, but not limitation, such pre-determined domains include restaurants, hotels, music, games, movies, weather, communication, and calendar, among others. Next, the explicit relations module infers explicit relations from the found queries, and generates an explicit relations data set that includes the queries associated with the inferred explicit relations (process action 204). Additionally, the implicit relations module infers implicit relations from the found queries, and generates an implicit relations data set that includes queries associated with the inferred implicit relations (process action 206). The training module then trains a semantic entity relation detection classifier using the explicit and implicit data sets to find an explicit or implicit relation, or both, in a query (process action 208). Each of the foregoing process actions will be described in more detail in the sections to follow.

1.1 Receiving the Query Click Log and Knowledge Graph

As indicated previously, the semantic entity relation detection classifier training implementations described herein involve training a classifier from the data taken from a knowledge graph and search query click log. These data sources will now be described in more detail.

1.1.1 Knowledge Graph

Graphical knowledge bases, or knowledge graphs for short, provide a powerful representation of entities and the relations between them. In general, a knowledge graph is a collection of assertions represented by triples consisting of two entities linked by some relation. For example, the assertion {directed by (Avatar, James Cameron)} specifies that the film entity "Avatar" was directed by the person entity "James Cameron", with "directed by" being the relation between these two entities.

Figure 3:
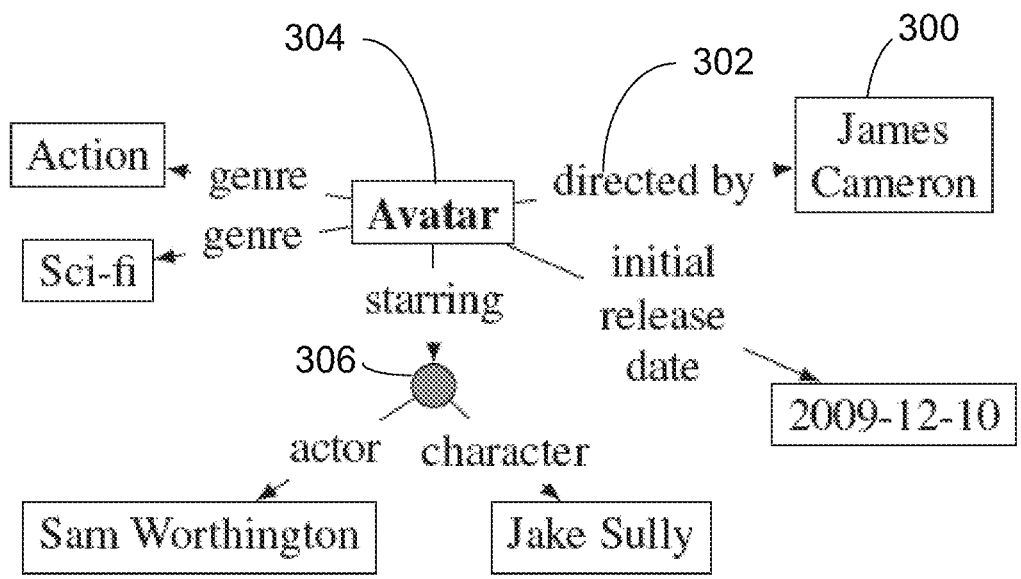
FIG. 3 is a diagram illustrating an exemplary portion of a knowledge graph in the form of a directed graph where each node represents an entity and each labeled edge represents a relation between two entities.

Often a knowledge graph, such as the portion of one illustrated in FIG. 3, takes the form of a directed graph where each node 300 represents an entity (e.g., Avatar or James Cameron) and each labeled edge 302 represents a relation between two entities (e.g., directed by). In many knowledge graphs, each entity also belongs to one or more entity types (e.g., Avatar belongs to the film type), and each type may have a schema specifying which relations should originate from the entities of that type (e.g., an entity of type film can have a directed by relation pointing to an entity of type film director). However, while the directed graph illustrated in FIG. 3 is a common form of a knowledge graph, the semantic entity relation detection classifier training implementations described herein can use any knowledge graph format, structure, or ontology, that models or structures the assertions in the knowledge graph without departing from the scope of the techniques, process, and features described herein. It is also noted that for the purposes of this description a reference to a knowledge graph does not necessarily mean a single graph from a single source. Rather, the term knowledge graph should be interpreted broadly and can include a graph that combines multiple individual knowledge graphs that may come from one or more sources.

1.1.2 Search Query Click Log

A query click log is a record of queries submitted by users to a search engine. Each query in the log includes the URLs associated with results presented to the submitting user in response to a search based on the query that the user selected (i.e., clicked on).

It is also noted that for the purposes of this description that a reference to a query click log does not necessarily mean a single log from a single source. Rather, the term query click log should be interpreted broadly and can include a log that combines multiple individual logs that may come from one or more sources.

1.2 Finding Entities and Queries

Figure 4:
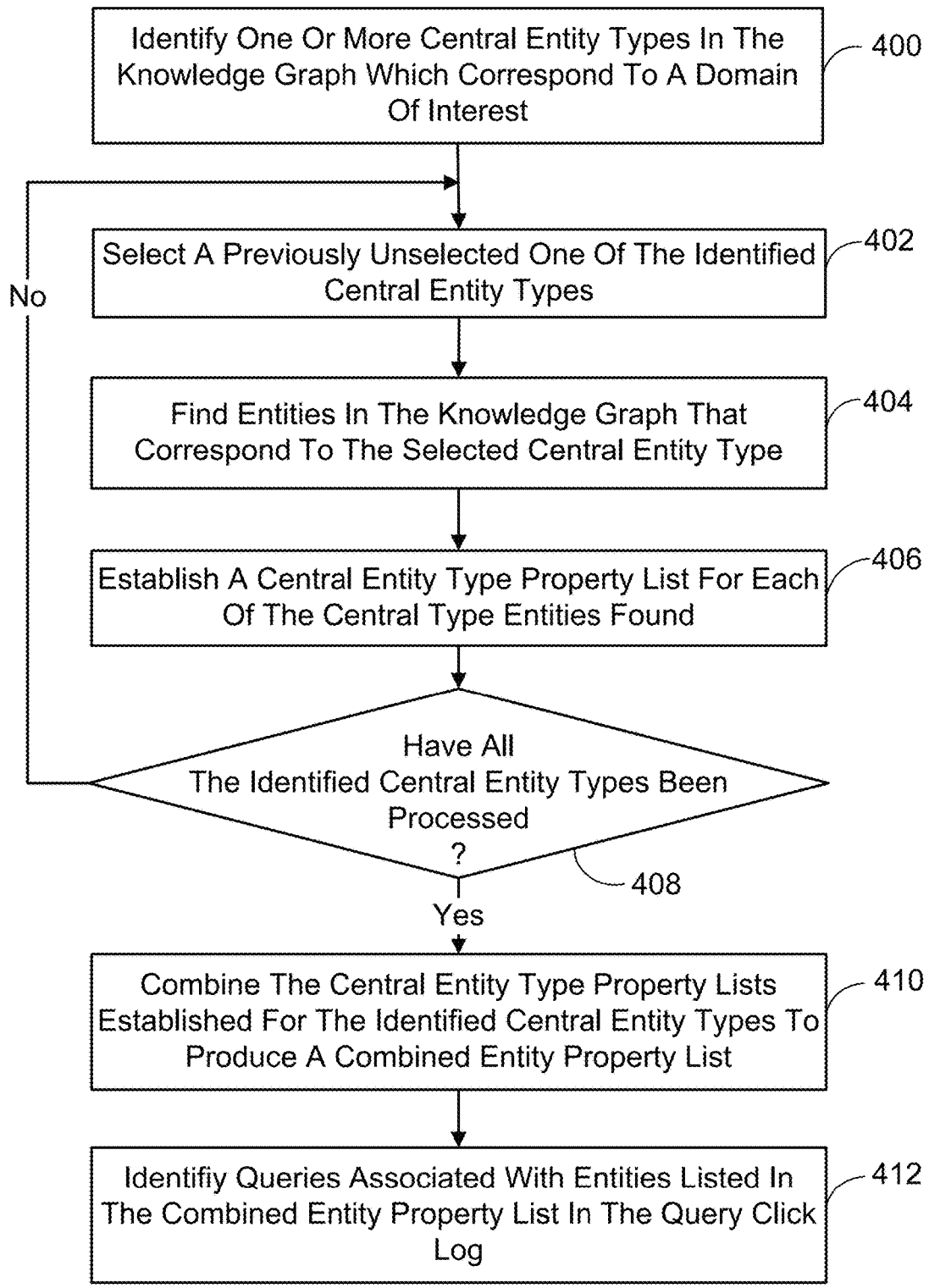
FIG. 4 is a flow diagram illustrating one implementation, in simplified form, of a process for finding queries in a query click log that are associated with entities in a knowledge graph.

In general, queries in the query click log are found that are associated with entities in the knowledge graph. This is accomplished in one implementation as illustrated in FIG. 4. First, one or more central entity types are identified in the knowledge graph which correspond to a domain of interest (process action 400). Central entities are the ones that are known to be the most likely entities requested by the users of the conversational system for each domain. For example, in a movie retrieval application, film could be the central entity type. A previously unselected one of the identified central entity types is then selected (process action 402). Entities in the knowledge graph corresponding to the selected central entity type are found next (process action 404). For convenience, these entities will sometimes be referred to as central type entities. For example, in the movie domain, it can be desirable to find a list of movies as well as their attributes (e.g., directors, actors, characters). Thus, entities of the central entity type corresponding to the desired domain (e.g., film type for the movie domain) would be found.

A central entity type property list is then established for each of the central type entities found (process action 406). A central entity type property list includes the central type entity under consideration and other entities in the knowledge graph having a prescribed degree of relation to that central type entity, as well as the type of relation existing between the central type entity and each of the other entities in the knowledge graph having the prescribed degree of relation to the central type entity under consideration. In one implementation, the prescribed degree of relation includes entities with an incoming relation in the knowledge graph from the central type entity under consideration, and entities reachable from the central type entity under consideration within a prescribed number of relations (e.g., 2).

More formally, referring again to FIG. 3, for an entity $e_c$ 304 of the central type (e.g., $e_c$=Avatar), the property list $P(e_c)$ of entities that are related to $e_c$ is established. $P(e_c)$ includes: 1) entities e with an incoming relation from $e_c$ (e.g., e=James Cameron via the relation directed by); 2) entities e reachable from $e_c$ within two relations (e.g., e=Jake Sully via the relations starring and character); and e=$e_c$ itself (e.g., e=Avatar). It is noted that some knowledge graphs (such as the collaborative knowledge base called Freebase) employ mediator nodes which do not count when computing the number of relations separating two entities. In FIG. 3, such a mediator node is represented by the small circle 306.

Referring again to FIG. 4, it is next determined if all the identified central entity types have been selected and processed (process action 408). If not, process actions 402 through 408 are repeated. Once all the identified central entity types have been selected and processed, the central entity type property lists established for the identified central entity types are combined to produce a combined entity property list (process action 410). More formally, the property lists $P(e_c)$ over all $e_c$ are combined to produce the list $u_{e_c}$ $P(e_c)$ of all entities related to the domain of interest. Queries associated with entities listed in the combined entity property list are then identified in the query click log (process action 412).

With regard to the foregoing action of identifying queries in the query click log that are associated with entities listed in the combined entity property list, there are several ways this can be accomplished. Generally, URLs are linked to knowledge graph entities using either seed queries or the URL relations in knowledge graphs.

More particularly, in one implementation employing a seed query procedure, for each entity from the combined entity property list, simple seed queries are formulated based on the entity name. In one version, the seed query takes the form of [entity name|domain or type name] (e.g. an entity of type 'film genre', such as horror, results in a seed query "horror movies", "horror films", etc.). The query click log is searched using the seed query. The URLs selected by a user in connection with those queries returned in the search are identified. Then, other queries that link to the same URLs in the query click log are also found. By traversing from seed queries to URLs and then to other queries, a two-step random walk through the query click log is effectively performed.

Figure 5:
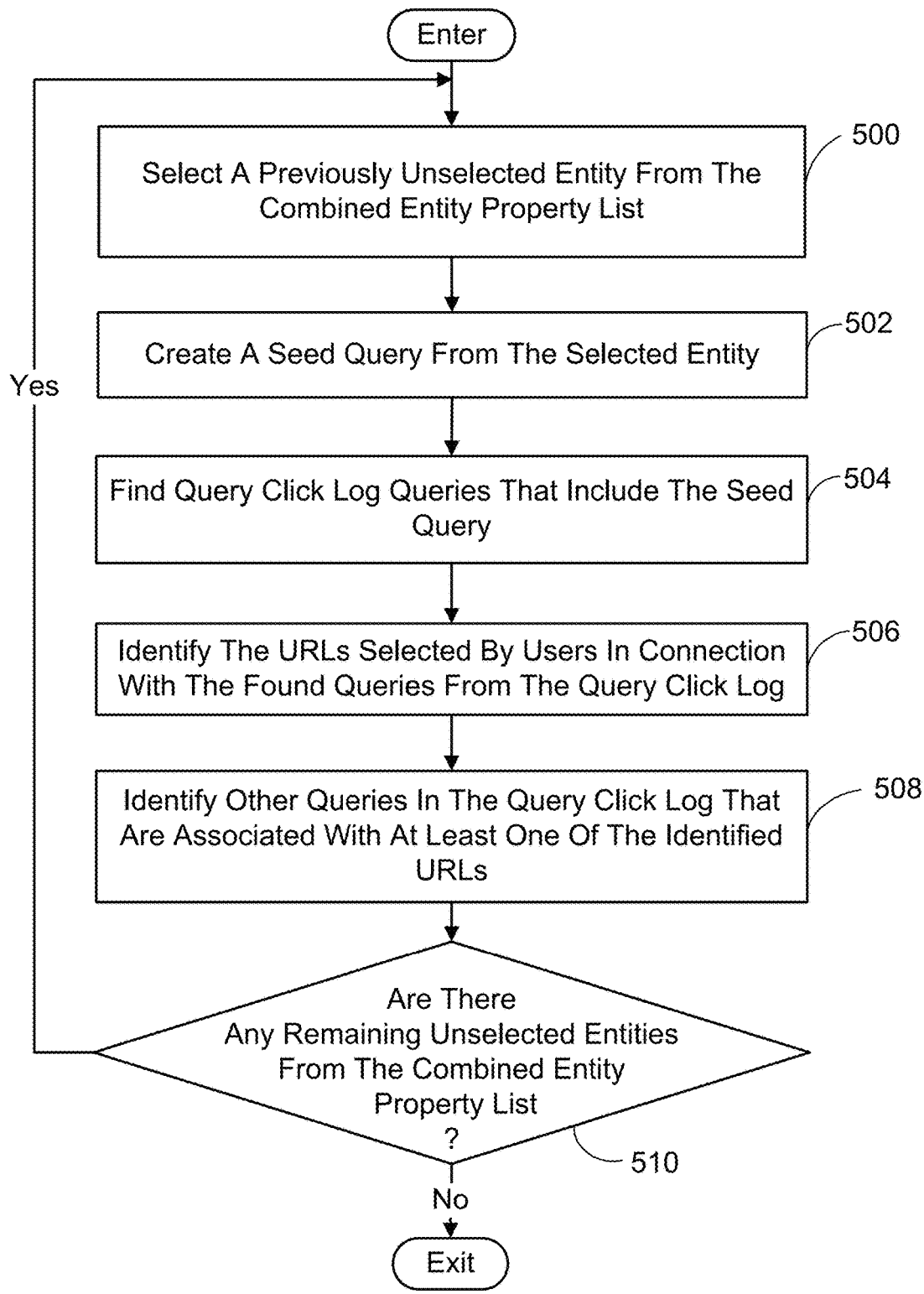
FIG. 5 is a flow diagram illustrating one implementation, in simplified form, of a process for identifying queries in the query click log that are associated with entities listed in a combined entity property list using seed queries.

In one version, illustrated in FIG. 5, the seed query process involves first selecting a previously unselected entity from the combined entity property list (process action 500), and creating a seed query from the selected entity (process action 502). Query click log queries that include the seed query are then found (process action 504). In one version, all the found queries are used in the actions to follow. However, in another version (not shown in FIG. 5), those queries that do not meet a prescribed length criteria, or quantity criteria, or both, are eliminated from consideration before proceeding. For example, queries that are shorter than 2 words could be removed, as they are more likely to be keyword search queries. The URLs selected by users in connection with the found queries (or the remaining found queries) are then identified from the query click log (process action 506). Next, other queries in the query click log that are associated with at least one of the identified URLs are identified (process action 508). It is then determined if there are any remaining unselected entities from the combined entity property list (process action 510). If so, process actions 500 through 510 are repeated. Otherwise the process ends. The initially found and later found queries are deemed to be the aforementioned identified queries associated with entities listed in the combined entity property list.

In another implementation, identifying queries in the query click log that are associated with entities listed in the combined entity property list, is generally accomplished using URLs from the semantic knowledge graph. Instead of getting URLs from seed queries, it is observed that in semantic knowledge graphs, entities often have several relations pointing to the URLs of either official websites or encyclopedic pages about the entities (e.g., Wikipedia pages). Given this it is possible to identify URLs in the semantic knowledge graph for the entities listed in the combined entity property list, and then to find queries in the query click log associated with an identified URL (i.e., a query associated with a URL that was selected by a user in the results returned from a search based on the query).

Figure 6:
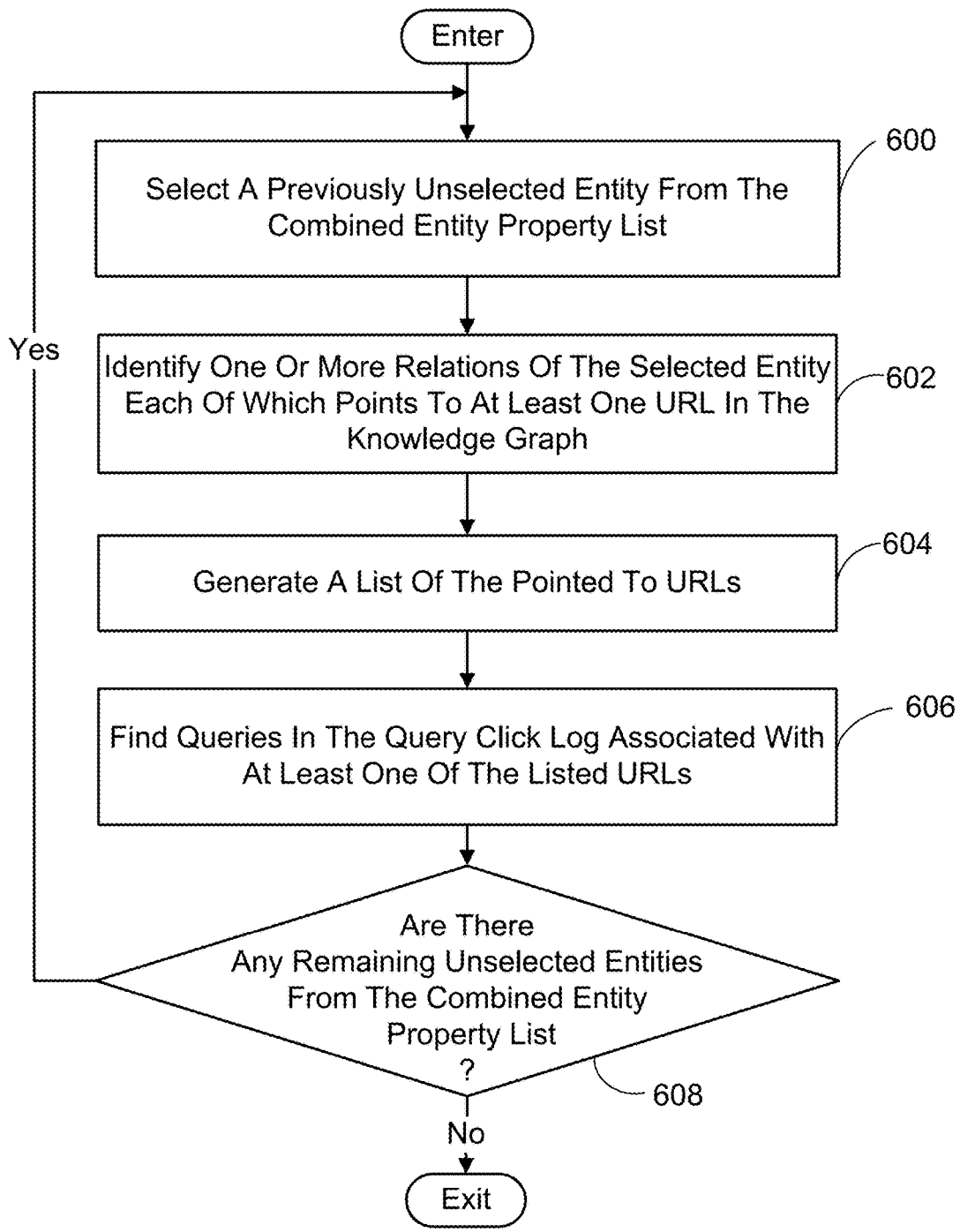
FIG. 6 is a flow diagram illustrating one implementation, in simplified form, of a process for identifying queries in the query click log that are associated with entities listed in a combined entity property list using URLs from the semantic knowledge graph.

In one version, illustrated in FIG. 6, the foregoing semantic knowledge graph URL-based process involves first selecting a previously unselected entity from the combined entity property list (process action 600), and then identifying one or more relations of the selected entity each of which points to at least one URL in the knowledge graph (process action 602). A list of the pointed to URLs is generated (process action 604). Queries in the query click log associated with at least one of the listed URLs (i.e., associated in that the URL was selected by a user in the results presented from a search performed for the query) are then found (process action 606). It is then determined if there are any remaining unselected entities from the combined entity property list (process action 608). If so, process actions 600 through 608 are repeated. Otherwise the process ends. The queries found to be associated via URLs with the entities from the combined entity property list are deemed to be the aforementioned identified queries.

It is noted that an advantage of using a query click log as a query source is that a large number of search queries are in question format, which is stylistically similar to spoken or natural language queries. Spoken language queries tend to infer relations between entities. However, some query click log queries can be keyword-type queries composed of noun phrases representing entities. As such, these queries would not include the relations between entities that are usable to train a semantic entity relation detection classifier. Accordingly, in one implementation, such non-spoken language queries are eliminated from the aforementioned found queries (if any exist). One way to eliminate such queries is to employ a classifier that separates natural language queries from keyword-type queries and just use the natural language queries. Another way is to choose only the queries that contain either common stop words or words that signal spoken queries (e.g., "show", "list", "want") which are likely to be natural language queries, or both.

1.3 Inferring Explicit Relations

Once queries from the combined entity property list are identified, explicit relations can be inferred from these queries and used to generate an explicit relations data set. Many queries explicitly specify the objects of some relations they contain. For example, the query "Who played Jake Sully in Avatar" includes the entities Avatar and Jake Sully and infers that the character relation (namely that Jake Sully is a character in Avatar). Such relations where the objects of the relation are explicitly included in the query can be referred to as explicit relations.

An explicit relation between two semantic entities can be defined in a number of ways. In one implementation of semantic entity relation detection classifier training, an explicit relation is defined as follows: the presence of an entity and another closely related entity in the same query infers an explicit relation between these entities. In general, the previously mined queries are scanned to find queries exhibiting an explicit relation as defined above, and the type of relations exhibited by the pair of entities in the query are determined. These queries and the type of explicit relation a pair of entities in each query exhibits will then be used in conjunction with other data to train a semantic entity relation detection classifier, as will be described later in this description.

To find closely related entities, the knowledge graph is employed. More particularly, an entity in the knowledge graph is considered closely related to another entity in the graph if it is connected to the other entity by no more than a prescribed number of intermediate entities. In one version, the prescribed number is one. In other words, entities that were directly connected to each other are considered closely related, as well as entities that are connected to another entity by no more than one intermediate entity. The distance between entities considered to be closely related could be more than one intermediate entity, but with possibly less accurate results.

Figure 7:
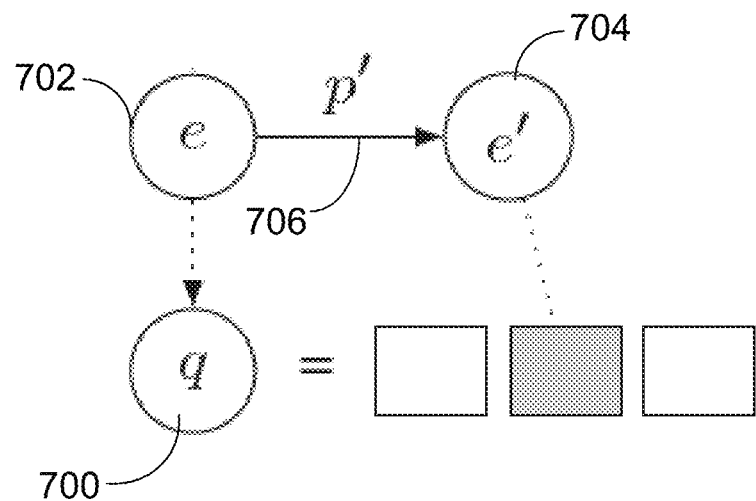
FIG. 7 is a diagram illustrating one implementation, in simplified form, for inferring an explicit relation in a query.

More formally, to infer explicit relations, the following observation can be used: in a query q that links to a URL of an entity e, it is likely that q mentions e and often some other entities e' closely related to e. For instance, the query q="Who played Jake Sully in Avatar", which is mined from the entity $e=e_c=$Avatar, contains the entities e=Avatar and e'=Jake Sully. The presence of e and e' can be used to infer an explicit relation. In the example above and referring to FIG. 3, since e'=Jake Sully is related to Avatar via the path (starring, character), it can be said that the query infers the explicit relation character. From this intuition, a dataset $D_E$ can be created. FIG. 7 illustrates this approach. For each query q 700 mined for entity e 702, approximate string matching is used to find all related entities e'∈P(e) 704 such that the name of e' appears in q. Then, the paths p' 706 from e to e' are translated into explicit relations (e.g., p'=(starring, character) translates to the relation character). Note that by the definition of P(e), e' is also allowed to be e itself, in which case the corresponding explicit relation is the type of e (e.g., e=e'=Avatar gives the relation movie name).

Figure 8:
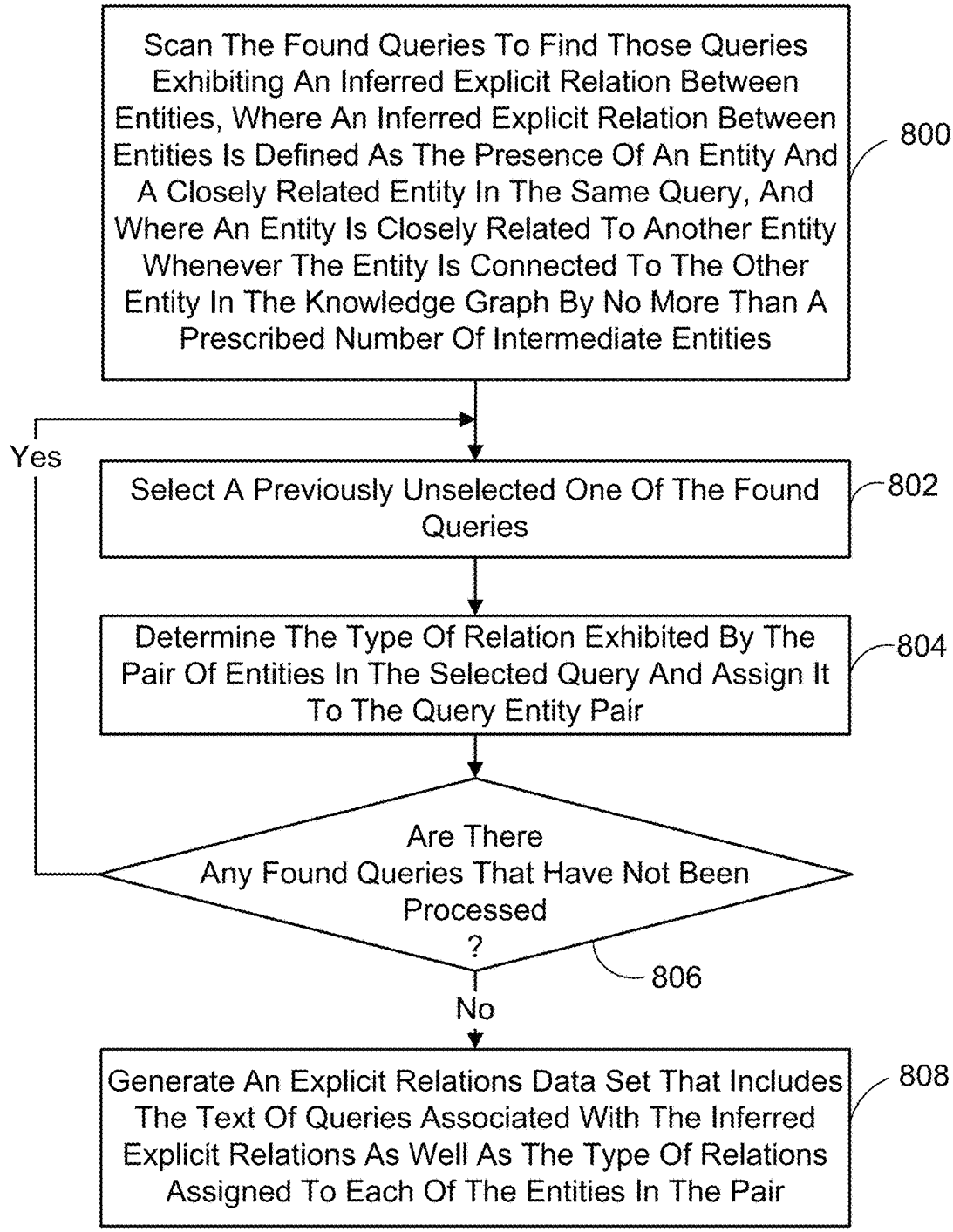
FIG. 8 is a flow diagram illustrating one implementation, in simplified form, of a process for inferring explicit relations from queries and generating an explicit relations data set.

In view of the foregoing, in one implementation shown in FIG. 8, inferring explicit relations from the found queries and generating an explicit relations data set includes scanning the found queries to find those queries exhibiting an inferred explicit relation between entities, where an inferred explicit relation between entities is defined as the presence of an entity and a closely related entity in the same query, and where an entity is closely related to another entity whenever the entity is connected to the another entity in the knowledge graph by no more than a prescribed number of intermediate entities (process action 800). In one version, the prescribed number of intermediate entities is one, such that entities that were directly connected to each other are considered closely related, as well as entities that are connected to another entity by no more than one intermediate entity. A previously unselected one of the found queries is then selected (process action 802), and the type of relations exhibited by the pair of entities in the selected query is determined and assigned to the query entity pair (process action 804). It is then determined if there are any found queries that have not been selected and processed (process action 806). If so, process actions 802 through 806 are repeated. Otherwise, an explicit relations data set is generated that includes the text of queries associated with the inferred explicit relations as well as the type of relations assigned to each of the entities in the pair (process action 808).

Figure 9:
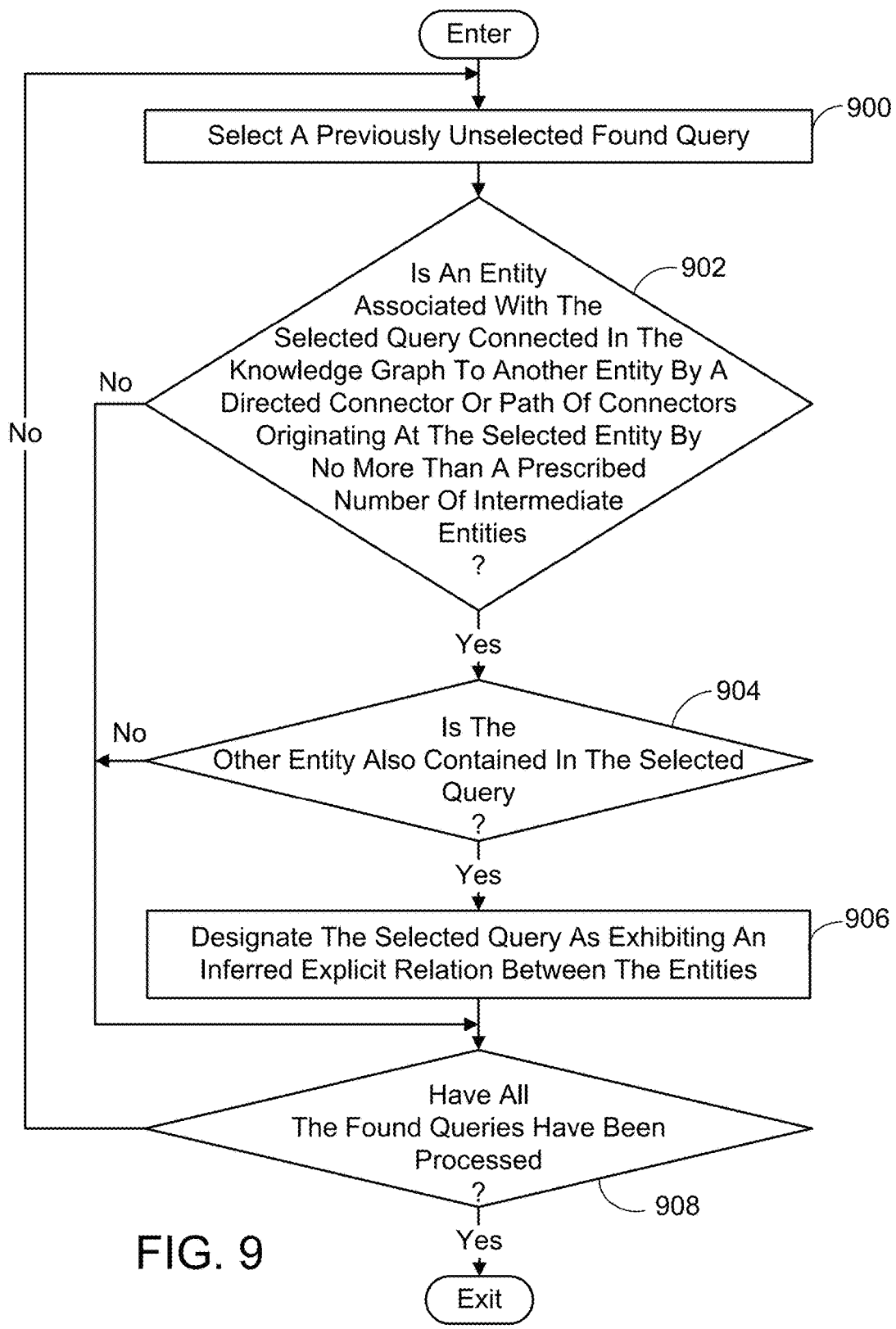
FIG. 9 is a flow diagram illustrating one implementation, in simplified form, of a process for scanning queries to find those queries exhibiting an inferred explicit relation between entities.

Referring to FIG. 9, in one version, scanning the found queries to find those queries exhibiting an inferred explicit relation between entities involves selecting a previously unselected found query (process action 900) and then determining if an entity associated with the selected query is connected in the knowledge graph to another entity by a directed connector or path of connectors originating at the selected entity by no more than the aforementioned prescribed number of intermediate entities (process action 902). If so, then it is determined if the other entity is also contained in the selected query (process action 904). If it is included therein, the selected query is designated as exhibiting an inferred explicit relation between the entities (process action 906). Once the selected query is designated as exhibiting an inferred explicit relation between the entities; or if the entity associated with the selected query is not connected in the knowledge graph to another entity by a directed connector or path of connectors originating at the selected entity by no more than the aforementioned prescribed number of intermediate entities; or if the other entity is not contained in the found query, then it is determined if all the found queries have been selected and processed (process action 908). If not then process actions 900 through 908 are repeated. Once all the queries have been considered, the process ends.

Figure 10:
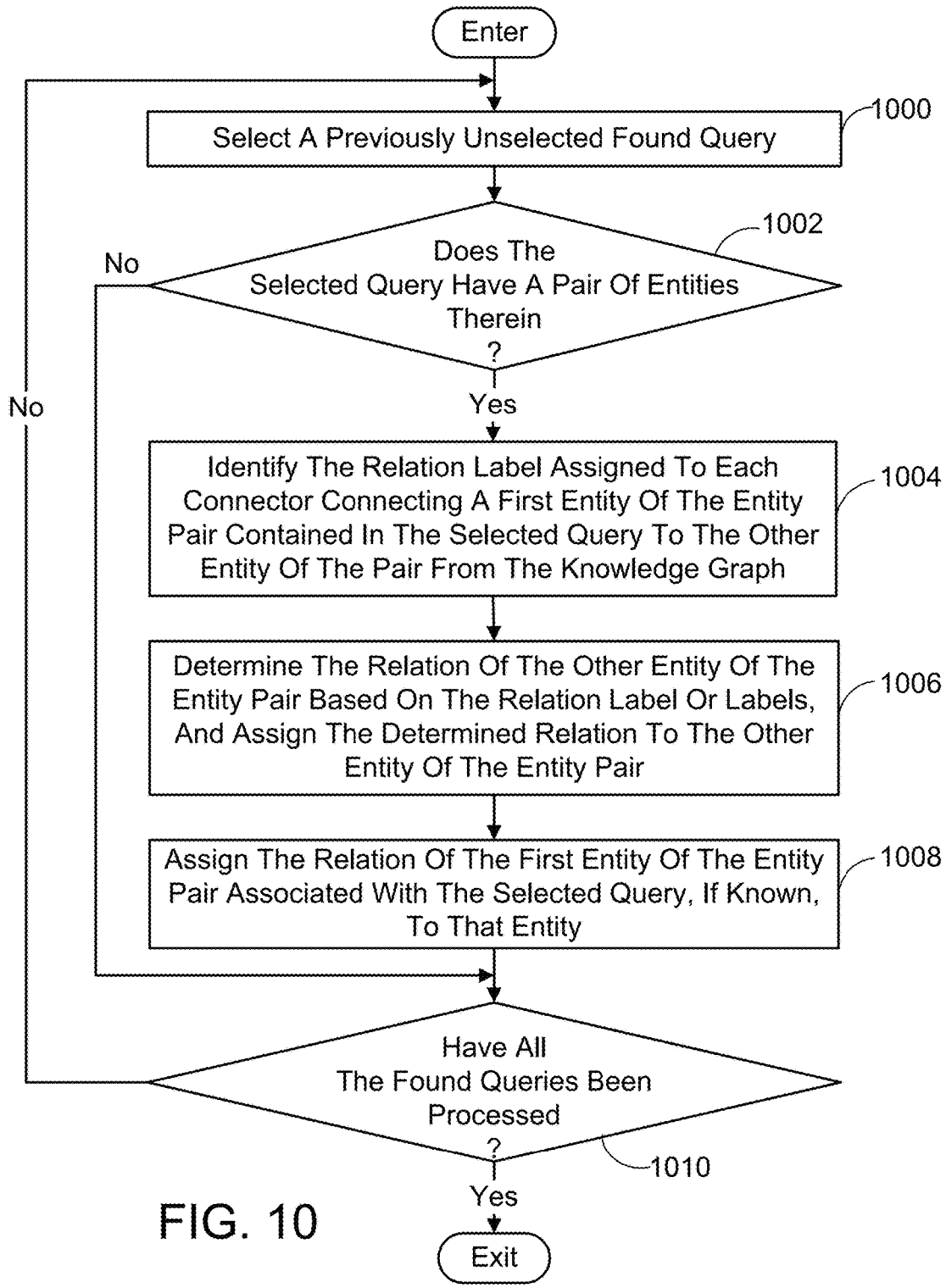
FIG. 10 is a flow diagram illustrating another implementation, in simplified form, of a process for scanning queries to find those queries exhibiting an inferred explicit relation between entities.

Referring to FIG. 10, in another version, scanning the found queries to find those queries exhibiting an inferred explicit relation between entities involves selecting a previously unselected found query (process action 1000) and then determining if the selected query has a pair of entities therein (process action 1002). If so, the relation label assigned to each connector connecting a first entity of the entity pair contained in the selected query to the other entity of the pair from the knowledge graph is identified (process action 1004). The relation of the other entity of the entity pair is determined based on the identify relation label or labels, and the determined relation is assigned to the other entity of the entity pair (process action 1006). In addition, the relation of the first entity of the entity pair associated with the selected query, if known, is assigned to that entity (process action 1008). Next, or if the selected query was determined not to have a pair of entities, it is determined if all the found queries have been selected and processed (process action 1010). If not, then process actions 1000 through 1010 are repeated. Once all the queries have been considered, the process ends.

Figure 11A:
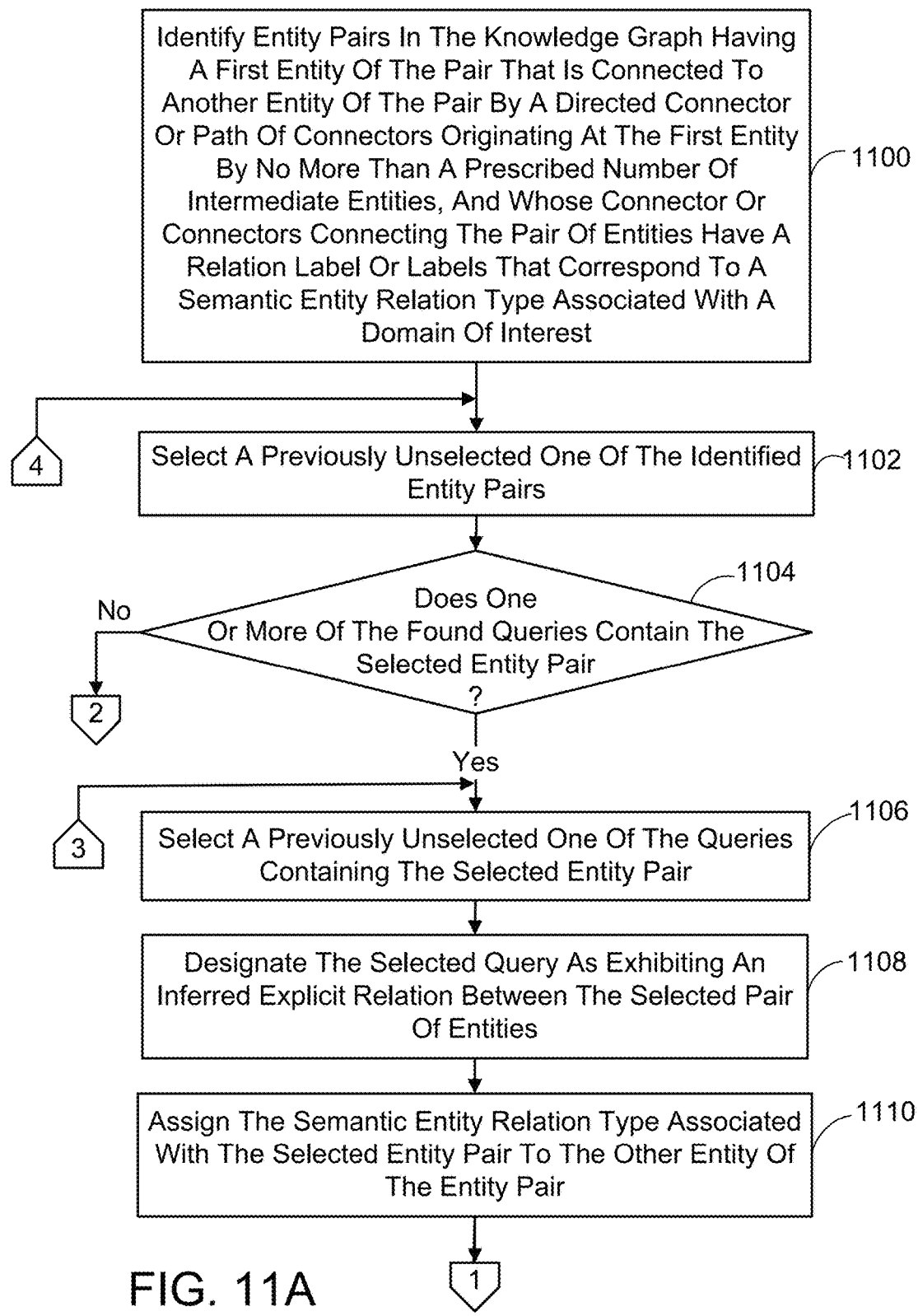
FIGS. 11A-B are a flow diagram illustrating yet another implementation, in simplified form, of a process for scanning queries to find those queries exhibiting an inferred explicit relation between entities.
Figure 11B:
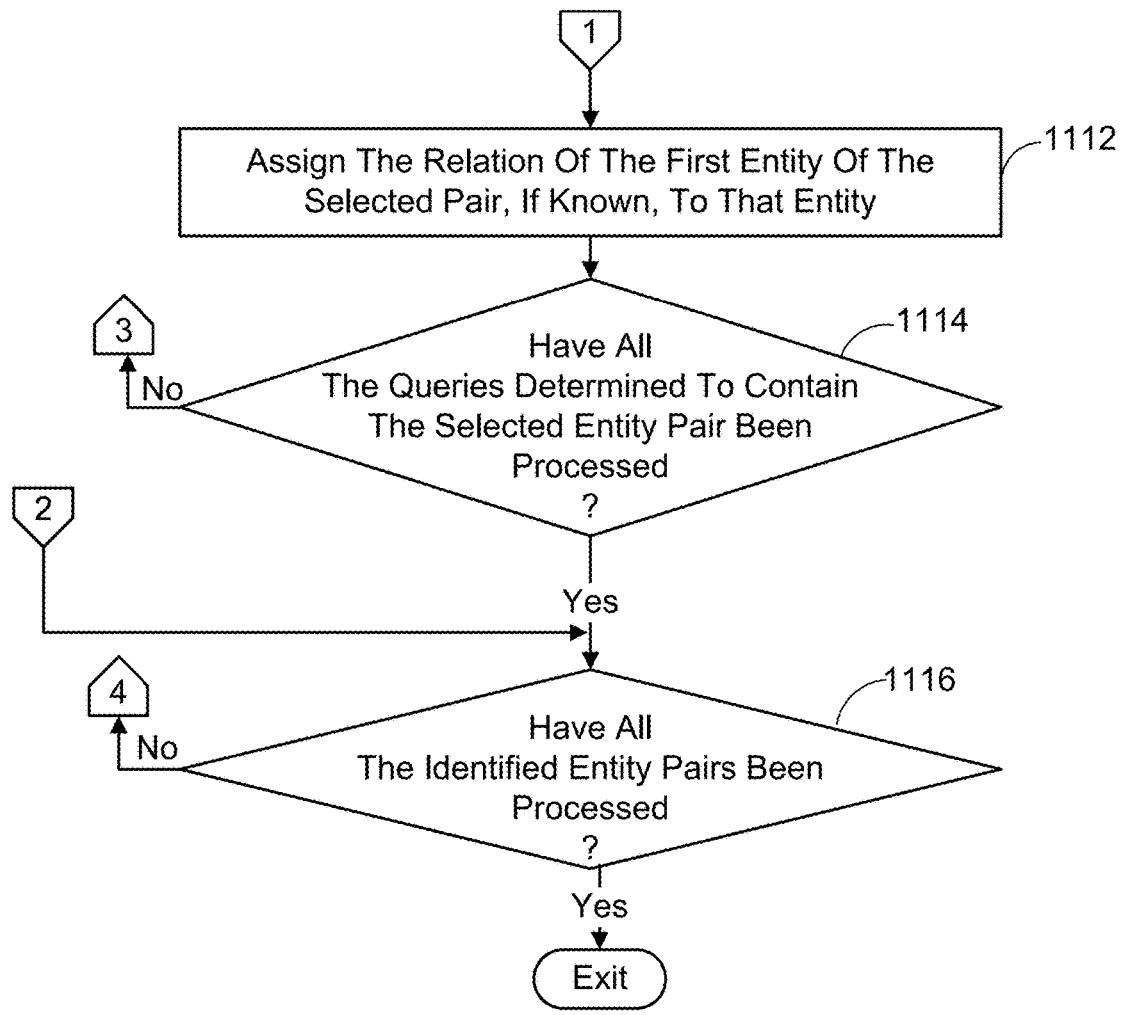

Referring to FIGS. 11A-B, in yet another version, scanning the found queries to find those queries exhibiting an inferred explicit relation between entities involves first identifying entity pairs in the knowledge graph having a first entity of the pair that is connected to another entity of the pair by a directed connector or path of connectors originating at the first entity by no more than the prescribed number of intermediate entities, and whose connector or connectors connecting the pair of entities have relation label or labels that correspond to a semantic entity relation type associated with a domain of interest (process action 1100). A previously unselected one of the identified entity pairs is selected (process action 1102), and it is determined if one or more of the found queries contain the selected entity pair (process action 1104). It is noted that in one version, the foregoing searching is performed using approximate string matching methods. In this way, an entity appearing in a query that is spelled, inflected, etc. differently than entity name found in the knowledge graph, but still referring to the same entity, are identified in the search. The approximate string matching methods can be employed in the above-described other processes for scanning the found queries as well. If one or more of the queries are found to contain the selected entity pair, a previously unselected one of these queries is selected (process action 1106). The selected query is designated as exhibiting an inferred explicit relation between the entities (process action 1108), and the semantic entity relation type associated with the selected entity pair is assigned to the other entity of the entity pair (process action 1110). In addition, the relation of the first entity of the selected pair, if known, is assigned to that entity (process action 1112). It is then determined if all the queries found to contain the selected entity pair have been selected and processed (process action 1114). If not, process actions 1106 through 1114 are repeated. Otherwise, or if it was determined previously that one or more of the queries did not contain the selected entity pair, it is determined if all the identified entity pairs have been selected and processed (process action 1116). If not, then process actions 1102 through 1116 are repeated. Once all the identified entity pairs have been selected and processed, the process ends.

Regardless of which of the foregoing implementations is employed (or a combination thereof) to scan the found queries, the aforementioned explicit relations data set is then created where each entry in the set includes the text of a query found to contain a closely related entity pair as well as the relation assigned to each of the entities in the pair. It is noted that a single query could include more than one closely related entity pair. Thus, the same query could appear in multiple entries in the explicit relations data set.

Additionally, the foregoing information can be used to automatically generate a listing of relation label annotated queries (often referred to as slot annotation) by annotating the occurrences of e' in q with the inferred relations. For example, the query "Who played Jake Sully in Avatar" would be annotated to read "Who played [Jake Sully] (character name) in [Avatar](film name)". The annotated queries can be used in a variety of applications, such as relation detection, named entity extraction and slot filling for spoken language understanding.

1.4 Inferring Implicit Relations

In addition to finding inferred explicit relations in query click log queries, inferred implicit relations are found as well and used to generate an implicit relations data set. Implicit relations are the relations whose objects are being asked about and thus are left unspecified in a query. For example, the query "Who directed Avatar" has the implicit relation directed by because it asks about the unspecified director's name.

To infer implicit relations, a property of the query click log can be exploited as illustrated by the following example. Consider queries of the form "Who directed [movie name]." It has been observed that most of the time, users who enter such queries will click on the official or encyclopedic pages about the movie. However, occasionally some users will click on web pages about the director of the movie. In such a case, it can be inferred that the query pattern "who directed . . . " has the implicit relation directed by. More generally, if the entity e corresponding to the clicked URL does not appear in the query q, it is inferred that the entity is likely the (missing) object of an implicit relation in the query.

Using the foregoing intuition, a dataset $D_I$ is created for training an implicit relation classifier as illustrated in FIG. 12. More formally, consider an entity e∈P(e) 1200 and a query q 1202 mined for e. If the name of e 1200 does not appear in q 1202, then the path p 1204 from $e_c$ 1206 to e is translated into an implicit relation (e.g., p=directed by in the example above translates to the directed by relation). In one version, to reduce noise, some out-of-domain queries are removed if they do not contain any entity related to e.

Figure 13A:
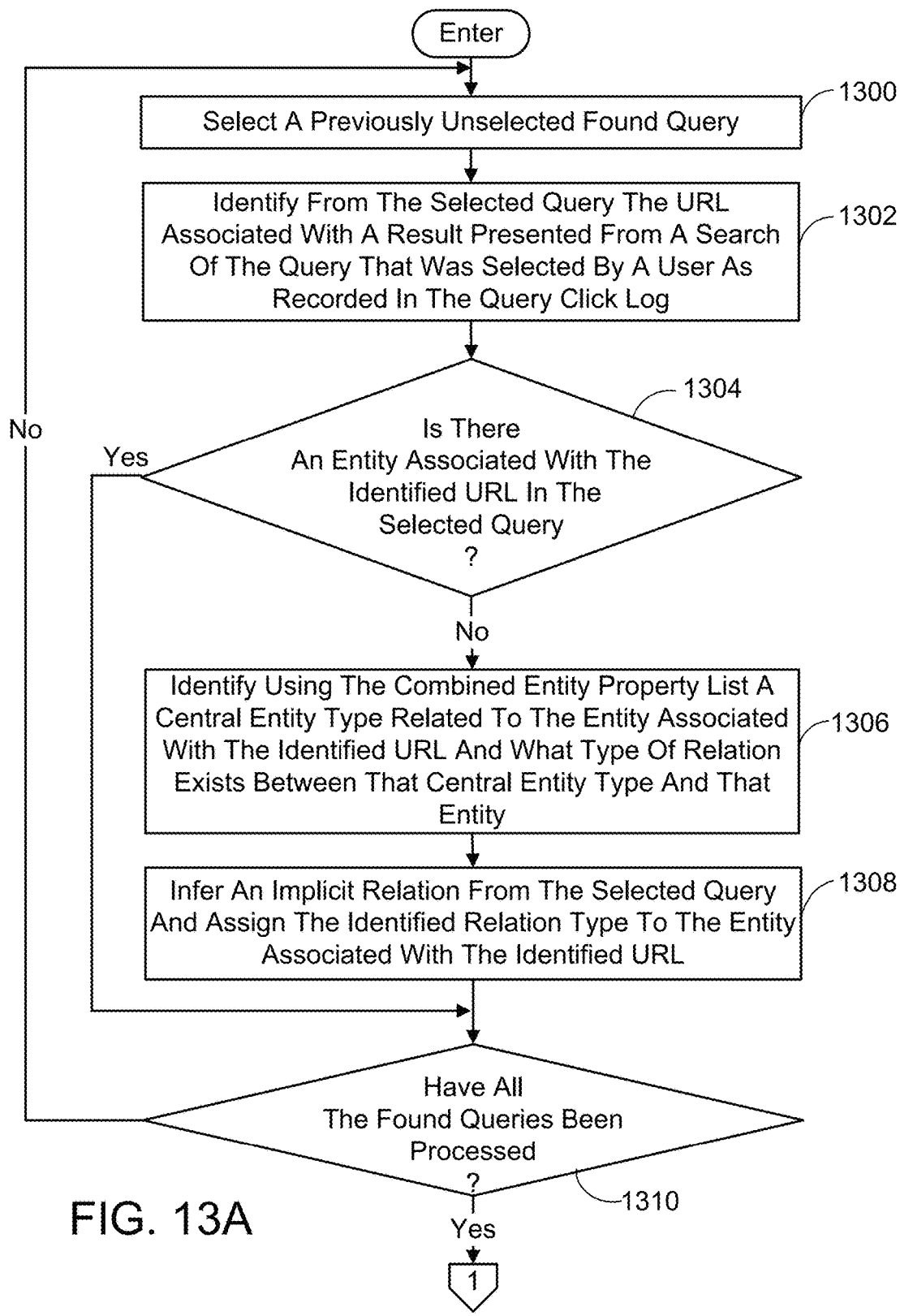
FIGS. 13A-B are a flow diagram illustrating one implementation, in simplified form, of a process for inferring implicit relations from found queries and generating an implicit relations data set.
Figure 13B:
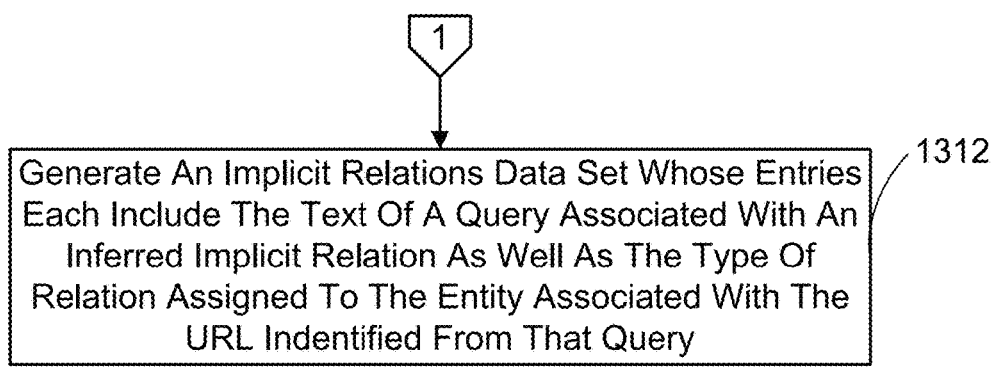

In view of the foregoing, in one implementation shown in FIGS. 13A-B, inferring implicit relations from the aforementioned found queries and generating an implicit relations data set involves first selecting a previously unselected found query (process action 1300) and then using the query click log to identify from the selected query the URL associated with a result presented from a search of the query that was selected by a user (process action 1302). Next, it is determined if an entity associated with the identified URL is found in the query (process action 1304). An entity is deemed to be associated with a URL if the entity points to that URL in the knowledge graph. If it is determined the entity associated with the identified URL is not found in the query, then the aforementioned combined entity property list is used to identify a central entity type related to the entity associated with the identified URL and what type of relation exists between that central entity type and the entity associated with the identified URL (process action 1306). As described previously, the type of relation of a closely related entity pair is determined using the words assigned to the connector or path of connectors connecting the entities in the knowledge graph. More particularly, the words assigned to the connector or path of connectors connecting the entities in the knowledge graph are translated into one of a plurality of standard or well known relation labels. Next, an implicit relation is inferred from the selected query and the identified relation type is assigned to the entity associated with the identified URL (process action 1308). Once an implicit relation is inferred, or if it was determined the entity associated with the identified URL is found in the query, it is then determined if all the found queries have been selected and processed (process action 1310). If not, process actions 1300 through 1310 are repeated. If so, then an implicit relations data set is generated whose entries each include the text of a query associated with an inferred implicit relation as well as the type of relation assigned to the entity associated with the URL identified from that query (process action 1312).

Figure 14A:
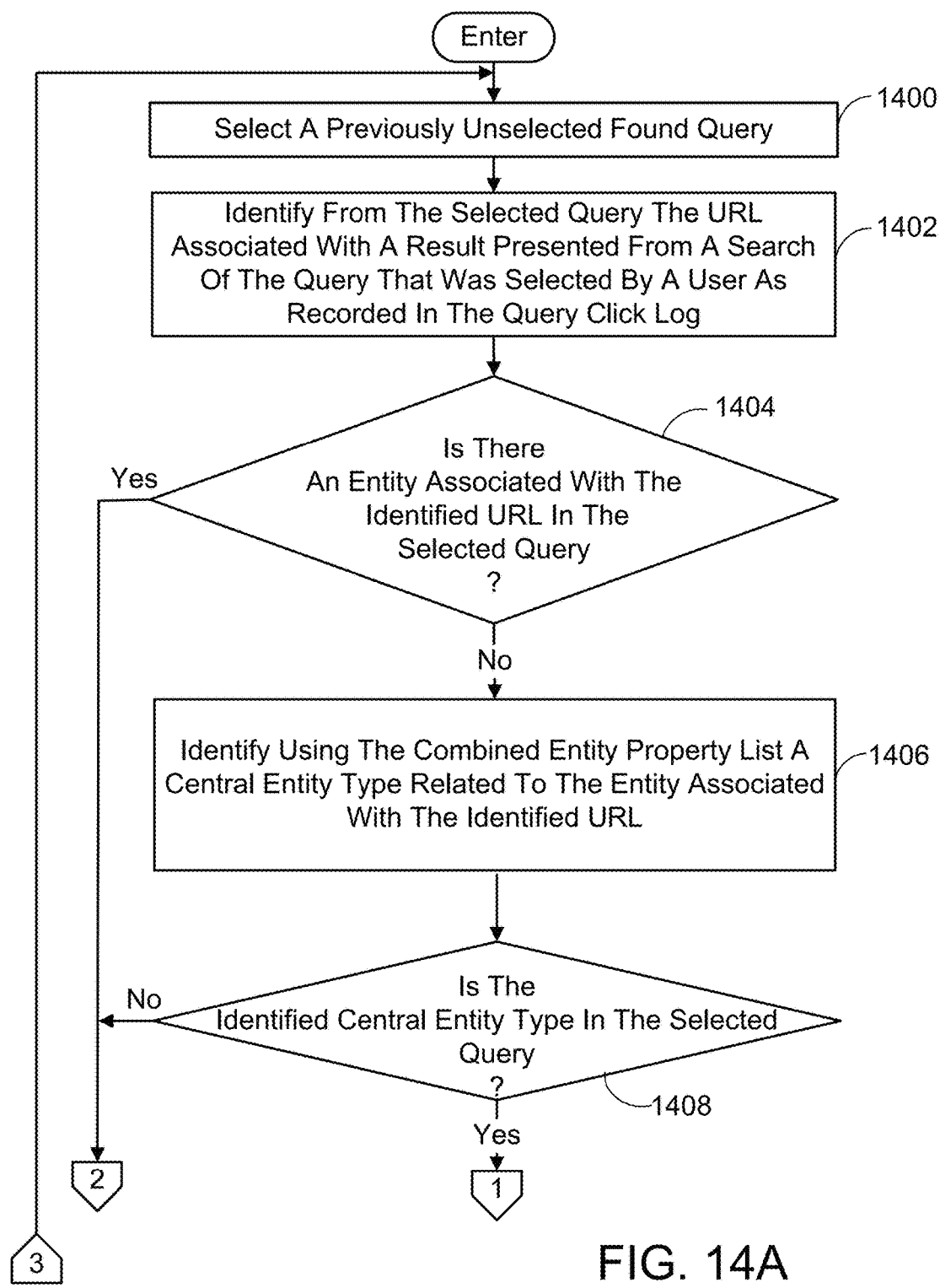
FIGS. 14A-B are a flow diagram illustrating another implementation, in simplified form, of a process for inferring implicit relations from found queries and generating an implicit relations data set.
Figure 14B:
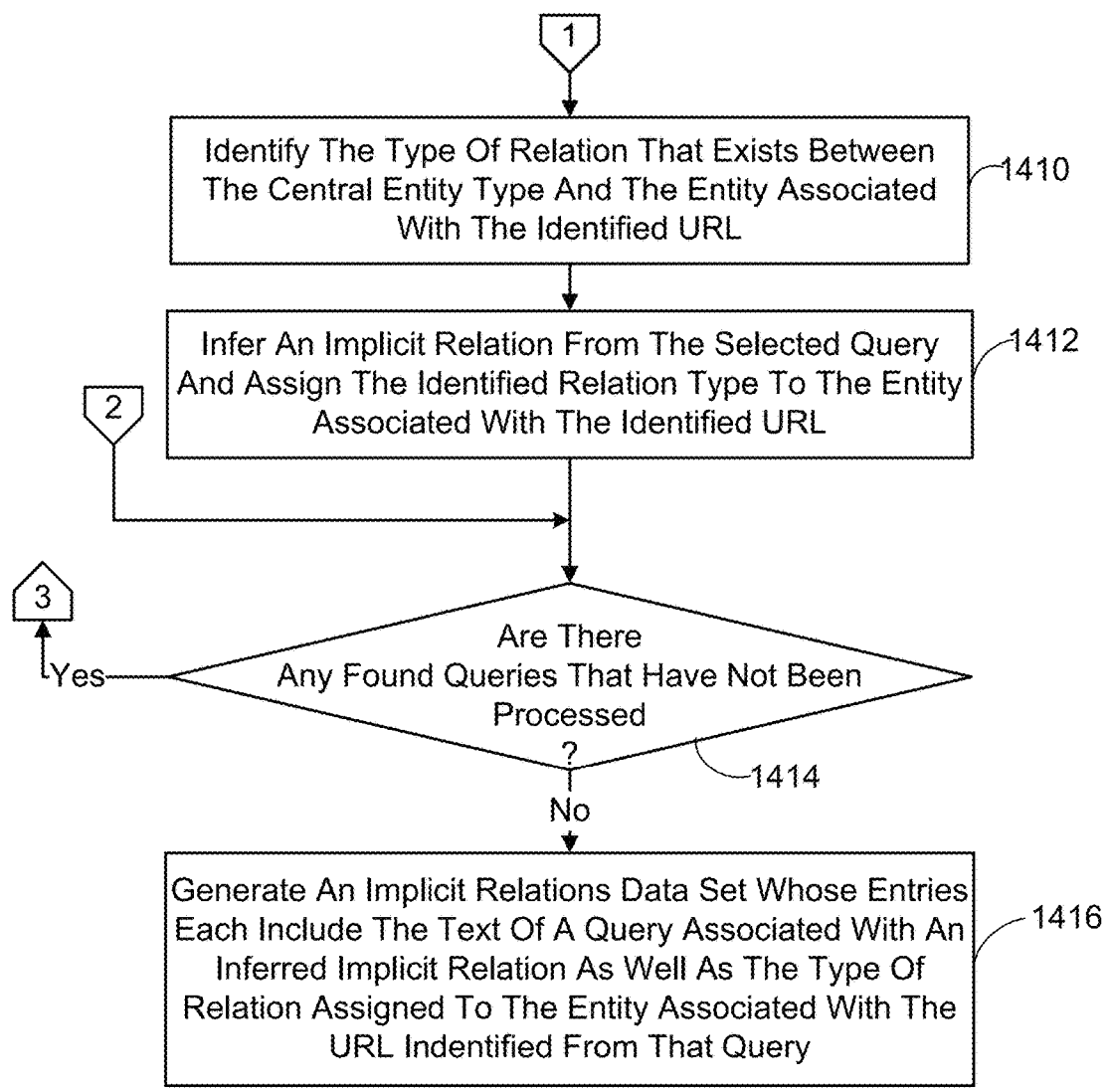

In another implementation shown in FIGS. 14A-B, inferring implicit relations from the aforementioned found queries and generating an implicit relations data set involves first selecting a previously unselected found query (process action 1400) and then using the query click log to identify from the selected found query the URL associated with a result presented from a search of the query that was selected by a user (process action 1402). Next, it is determined if an entity associated with the identified URL is found in the query (process action 1404). An entity is deemed to be associated with a URL if the entity points to that URL in the knowledge graph. If it is determined the entity associated with the identified URL is not found in the query, then the aforementioned combined entity property list is used to identify a central entity type related to the entity associated with the identified URL (process action 1406). It is then determined if the identified central entity type is found in the selected query (process action 1408). If so, the type of relation that exists between the central entity type and the entity associated with the identified URL, is identified (process action 1410). Next, an implicit relation is inferred from the selected query and the identified relation type is assigned to the entity associated with the identified URL (process action 1412). It is noted that in this implementation an implicit relation is inferred only if the identified central entity type is present in the selected query to reduce the number of false implicit relations found. Once an implicit relation is inferred, or if it was determined the entity associated with the identified URL is found in the query, or if the identified central entity type is not found in the selected query, it is then determined if there are found queries that have not been selected and processed (process action 1414). If so, process actions 1400 through 1414 are repeated. If not, then an implicit relations data set is generated whose entries each include the text of a query associated with an inferred implicit relation as well as the type of relation assigned to the entity associated with the URL identified from that query (process action 1416).

Figure 15A:
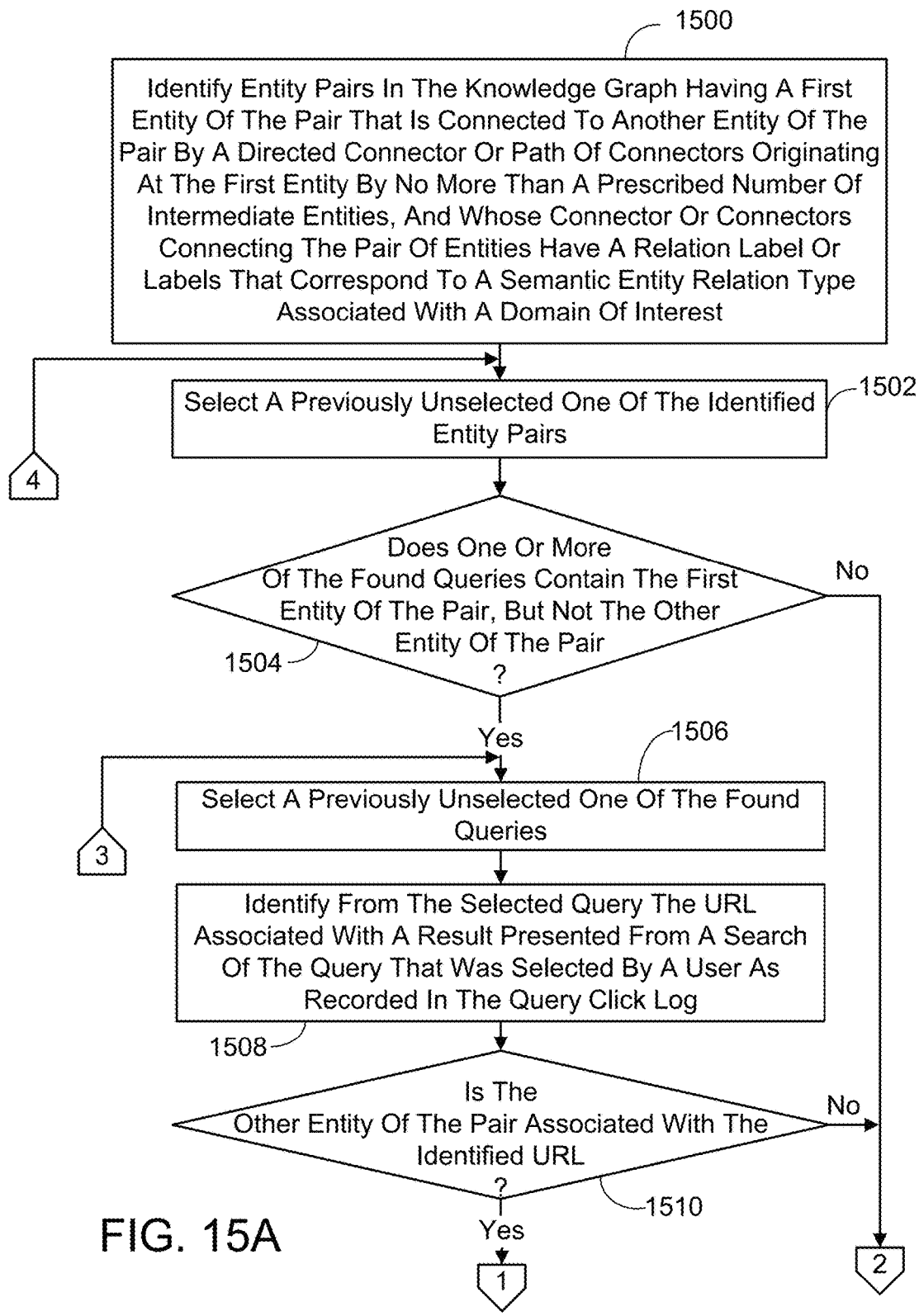
FIGS. 15A-B are a flow diagram illustrating yet another implementation, in simplified form, of a process for inferring implicit relations from found queries and generating an implicit relations data set.
Figure 15B:
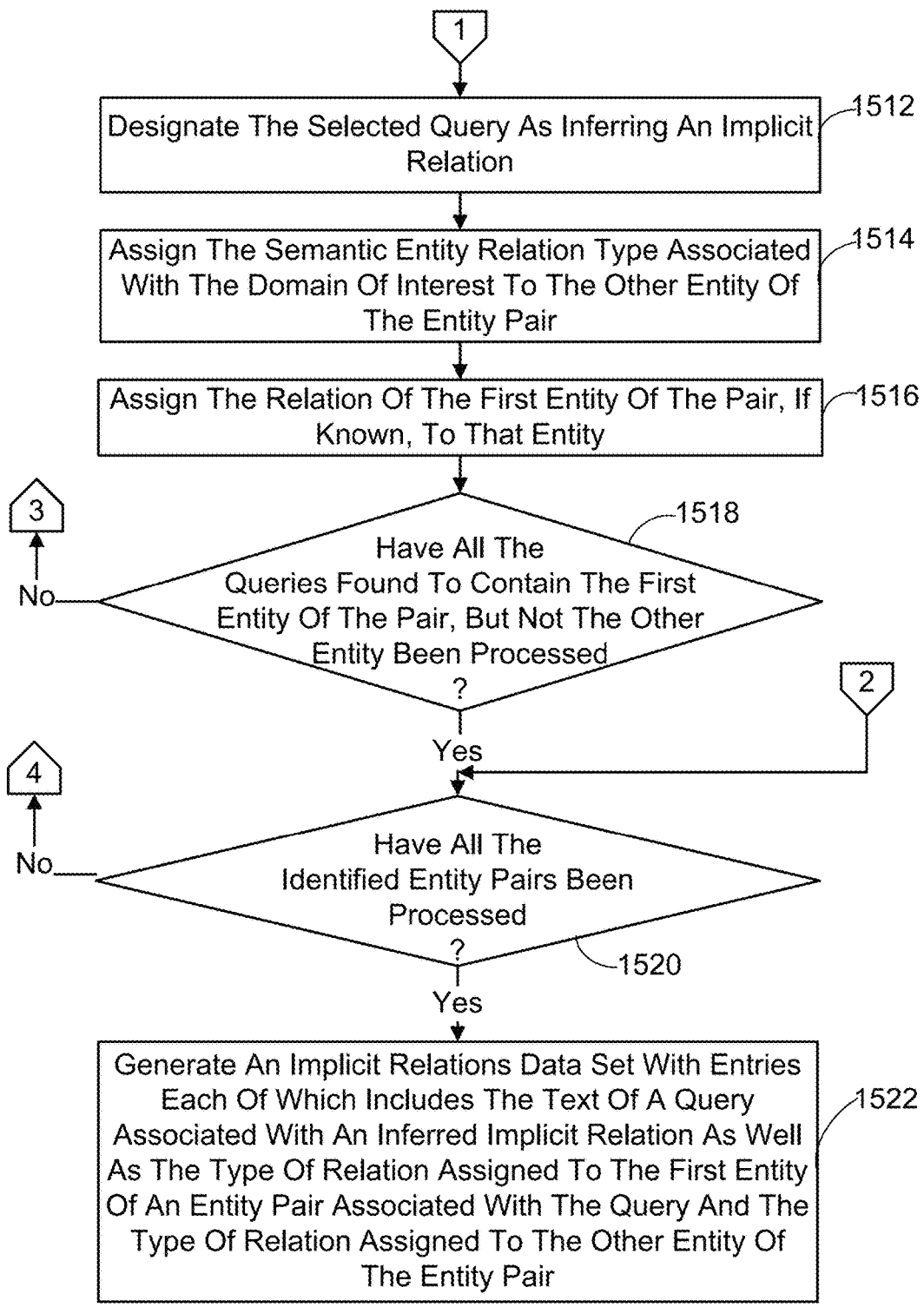

In yet another implementation shown in FIGS. 15A-B, inferring implicit relations from the aforementioned found queries and generating an implicit relations data set involves first identifying entity pairs in the knowledge graph having a first entity of the pair that is connected to another entity of the pair by a directed connector or path of connectors originating at the first entity by no more than the prescribed number of intermediate entities, and whose connector or connectors connecting the pair of entities have relation label or labels that correspond to a semantic entity relation type associated with a domain of interest (process action 1500). A previously unselected one of the identified entity pairs is selected (process action 1502), and it is determined if one or more of the previously found queries contains the first entity of the pair, but not the other entity of the pair (process action 1504). It is noted that in one version, the foregoing searching is performed using approximate string matching methods. If one or more of the queries are found to contain the first entity of the pair, but not the other entity of the pair, a previously unselected one of these queries is selected (process action 1506). Next, the aforementioned query click log is used to identify from the selected query the URL associated with a result presented from a search of the query that was selected by a user (process action 1508), and it is determined if the other entity of the pair is associated with the identified URL (process action 1510). As indicated previously, an entity is associated with a URL if the entity points to that URL in the knowledge graph. If it is determined that the other entity of the pair is associated with the identified URL, then the selected query is designated as inferring an implicit relation (process action 1512), the semantic entity relation type associated with the domain of interest is assigned to the other entity of the entity pair (process action 1514), and the relation of the first entity of the pair, if known, is assigned to that entity (process action 1516). It is next determined if all the queries found to contain the first entity of the pair, but not the other entity of the pair, have been selected and processed (process action 1518). If not, process actions 1506 through 1518 are repeated. However, if all the queries found to contain the first entity of the pair, but not the other entity of the pair, have been selected and processed; or if it was determined that no query contained the first entity of the pair, but not the other entity of the pair; or if it was determined that the other entity of the pair is not associated with the identified URL, then it is determined if all the identified entity pairs is selected and processed (process action 1520). If not, then process actions 1502 through 1520 are repeated. Once all the identified entity pairs have been selected and processed, the implicit relations data set is generated with entries each of which includes the text of a query associated with an inferred implicit relation as well as the type of relation assigned to the first entity of an entity pair associated with the query and the type of relation assigned to the other entity of the entity pair (process action 1522).

Figure 16A:
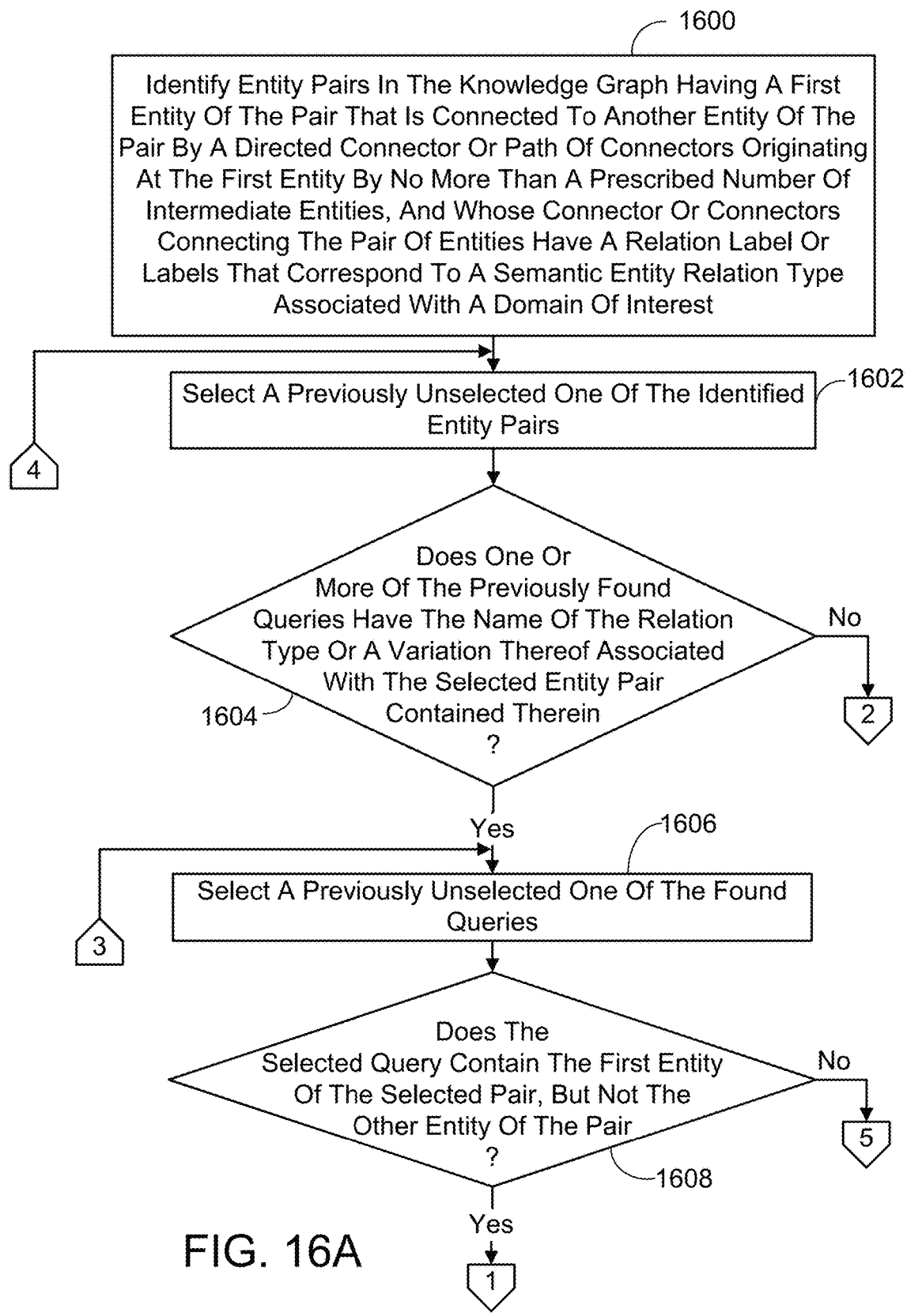
FIGS. 16A-B are a flow diagram illustrating still another implementation, in simplified form, of a process for inferring implicit relations from found queries and generating an implicit relations data set.
Figure 16B:
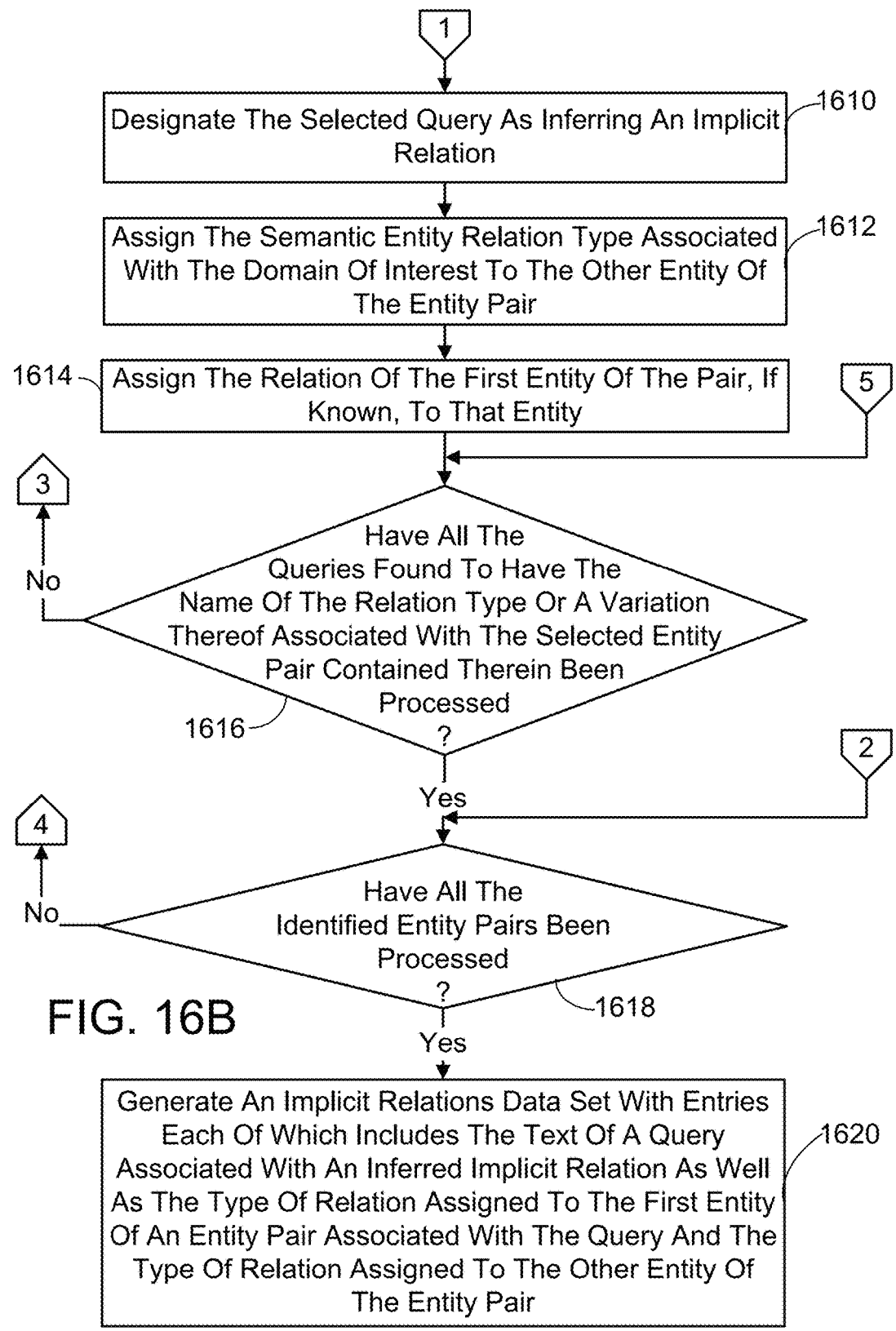

In still another implementation shown in FIGS. 16A-B, inferring implicit relations from the aforementioned found queries and generating an implicit relations data set involves first identifying entity pairs in the knowledge graph having a first entity of the pair that is connected to another entity of the pair by a directed connector or path of connectors originating at the first entity by no more than the prescribed number of intermediate entities, and whose connector or connectors connecting the pair of entities have relation label or labels that correspond to a semantic entity relation type associated with a domain of interest (process action 1600). A previously unselected one of the identified entity pairs is selected (process action 1602). It is then determined if one or more of the previously found queries has the name of the relation type or a variation thereof associated with the selected entity pair contained therein (process action 1604). If so, a previously unselected one of these queries is selected (process action 1606), and it is determined if the selected query contains the first entity of the pair, but not the other entity of the pair (process action 1608). It is noted that in one version, the foregoing searching is performed using approximate string matching methods. If the selected query is found to contain the first entity of the pair, but not the other entity of the pair, then the selected query is designated as inferring an implicit relation (process action 1610), the semantic entity relation type associated with the domain of interest is assigned to the other entity of the entity pair (process action 1612), and the relation of the first entity of the pair, if known, is assigned to that entity (process action 1614). Once the foregoing assignments are complete; or if the selected query does not contain the first entity of the pair, or it contains the other entity of the pair, then it is determined if all the queries found to have the name of the relation type or a variation thereof associated with the selected entity pair contained therein have been selected and processed (process action 1616). If not, process actions 1606 through 1616 are repeated. Once all the queries found to have the name of the relation type or a variation thereof associated with the selected entity pair contained therein have been selected and processed, it is determined if all the identified entity pairs have been selected and processed (process action 1618). If not, process actions 1602 through 1618 are repeated. Once all the identified entity pairs have been selected and processed, the implicit relations data set is generated with entries each of which includes the text of a query associated with an inferred implicit relation as well as the type of relation assigned to the first entity of an entity pair associated with the query and the type of relation assigned to the other entity of the entity pair (process action 1620).

Additionally, the foregoing inferred implicit relation information can be used to generate a listing of generic query patterns which can be useful in a variety of applications such as relation detection, language modeling, and question answering. This can be accomplished by, for each relation type name in the domain of interest, identifying queries previously found to have the implicit relation associated with the type name under consideration. Then, for each of the identified queries, the entity (or entities if more than one) assigned the type name under consideration are replaced with a placeholder of the type name. For example, "Who directed Avatar" becomes "Who directed [film]". It is also noted that the same query can have more than one entity and have entities assigned different relation type names. In such a case, when each of these type names is considered, the associated entity would be replaced, and result in a query with multiple type name placeholders. FIG. 17 shows a table having several examples of query patterns derived from an implicit relation dataset.

1.5 Training a Semantic Entity Relation Detection Classifier

The foregoing system and processes produce two data sets-namely an explicit relations data set $D_E$ and an implicit relations data set $D_I$. These data sets are used to train a semantic entity relation detection classifier that is used to find relations in a natural language query. In one implementation, just the explicit relations data set is used to train an explicit relations classifier. As such, the previously described actions associated with inferring implicit relations and creating an implicit relations data set can be skipped. In another implementation, just the implicit relations data set is used to train an implicit relations classifier. In this case, the previously described actions associated with inferring explicit relations and creating an explicit relations data set can be skipped. Each of these classifiers is advantageous. However, it was found that a combined semantic entity relation detection classifier trained using both the explicit and implicit relations data sets is able to identify relations in a query better than either an explicit relations classifier or implicit relations classifier alone.

It is noted that the semantic entity relation detection classifier training implementations described herein can perform the classifier training/learning using any semi-supervised or unsupervised machine learning method such as a conventional logistic regression method, or a conventional decision trees method, or a conventional support vector machine method, among other types of machine learning methods. It is also noted that the semantic entity relation detection classifier training implementations can be used to train a variety of classifiers including a conventional support vector machine, or a conventional artificial neural network, or a conventional Bayesian statistical classifier, among other types of classifiers.

Figure 18:
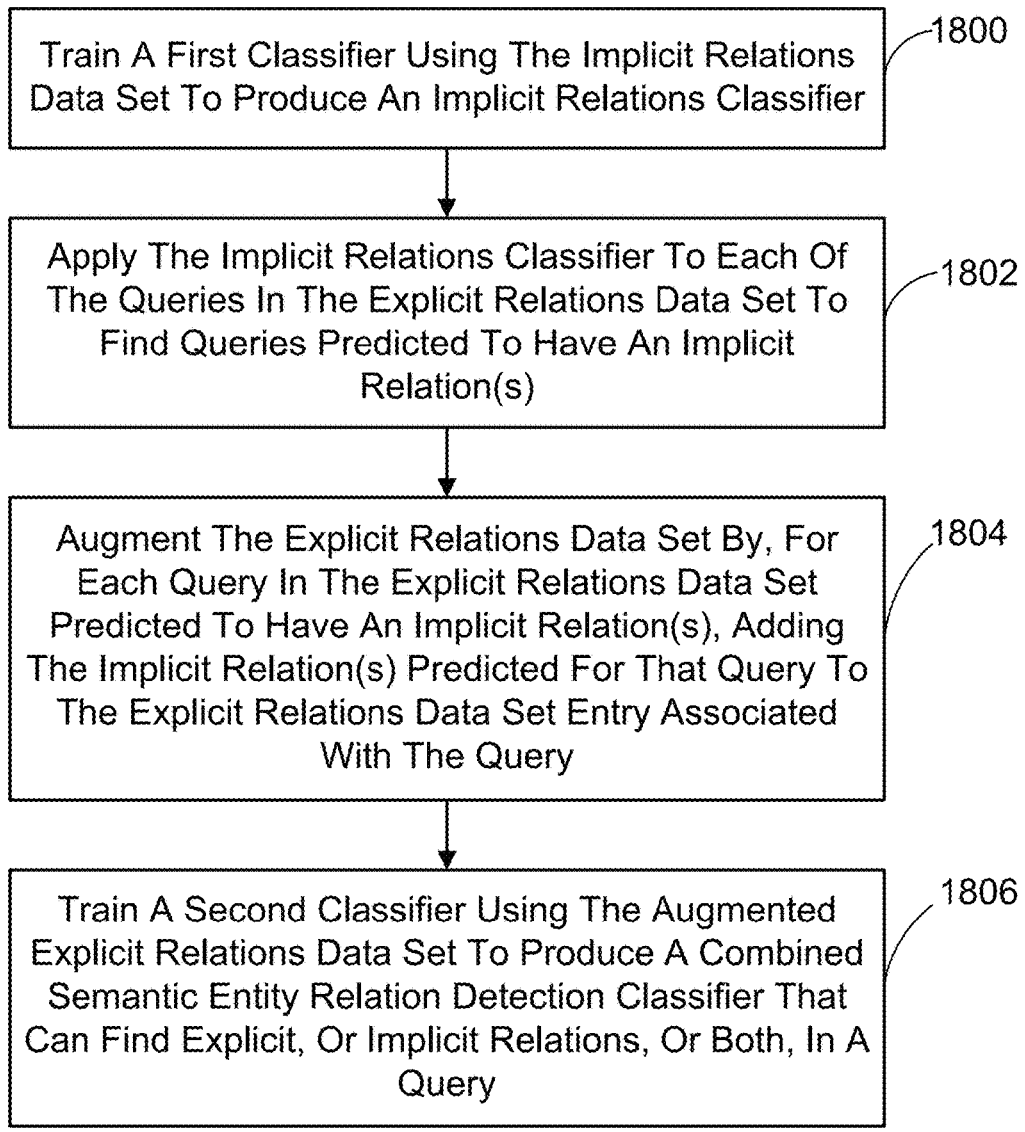
FIG. 18 is a flow diagram illustrating one implementation, in simplified form, of a process for training a combined semantic entity relation detection classifier that identifies explicit, or implicit relations, or both, in a query.

In one implementation, a combined semantic entity relation detection classifier is trained as follows. Referring to FIG. 18, a first classifier is trained using the implicit relations data set to produce an implicit relations classifier that can find implicit relations in a query (process action 1800). The implicit relations classifier is then applied to each of the queries in the aforementioned explicit relations data set to find queries predicted to have an implicit relation or implicit relations (process action 1802). The explicit relations data set is then augmented, which involves, for each query in the explicit relations data set predicted to have an implicit relation or implicit relations, adding the implicit relation or implicit relations predicted for that query to the explicit relations data set entry associated with the query (process action 1804). This produces an augmented explicit relations data set. Next, a second classifier is trained using the augmented explicit relations data set to produce a combined semantic entity relation detection classifier (process action 1806) that can find explicit, or implicit relations, or both, in a query.

1.6 Using a Semantic Entity Relation Detection Classifier

The semantic entity relation detection classifier training implementations described herein are used to train a semantic entity relation detection classifier to identify relations expressed in a natural language query. The trained classifier can be used in a variety of applications. For example, the trained classifier is applicable to a wide variety of dialog system modalities, both input and output. It is capable of responding to conversational inputs (e.g., question answering) such as, but not limited to, speech, writing (e.g., text or handwriting), touch, gesture, and combinations thereof (e.g., multi-mode systems). It can also be employed for named entity extraction and slot filling for spoken language understanding, language modeling, and question answering. Of course, the foregoing are merely illustrative of suitable implementations and should not be construed as limiting the scope to and particularly modality or modalities and should be read broadly to encompass other modalities along with the corresponding hardware and/or software modifications to implement such modalities.

2.0 Exemplary Operating Environments

Figure 19:
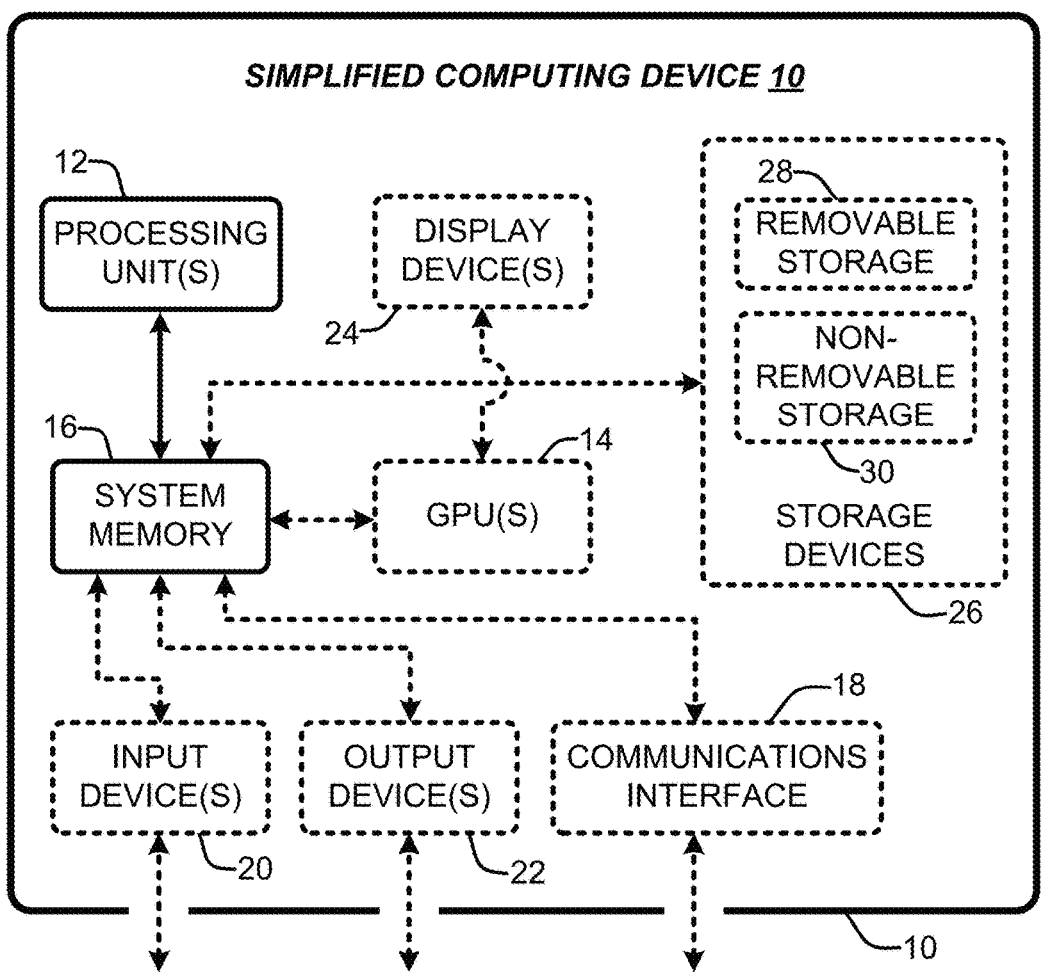
FIG. 19 is a diagram depicting a general purpose computing device constituting an exemplary system for use with the semantic entity relation detection classifier training implementations described herein.

The semantic entity relation detection classifier training implementations described herein are operational using numerous types of general purpose or special purpose computing system environments or configurations. FIG. 19 illustrates a simplified example of a general-purpose computer system with which various aspects and elements of semantic entity relation detection classifier training, as described herein, may be implemented. It is noted that any boxes that are represented by broken or dashed lines in the simplified computing device 10 shown in FIG. 19 represent alternate implementations of the simplified computing device. As described below, any or all of these alternate implementations may be used in combination with other alternate implementations that are described throughout this document. The simplified computing device 10 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To realize the semantic entity relation detection classifier training implementations described herein, the device should have a sufficient computational capability and system memory to enable basic computational operations. In particular, the computational capability of the simplified computing device 10 shown in FIG. 19 is generally illustrated by one or more processing unit(s) 12, and may also include one or more graphics processing units (GPUs) 14, either or both in communication with system memory 16. Note that that the processing unit(s) 12 of the simplified computing device 10 may be specialized microprocessors (such as a digital signal processor (DSP), a very long instruction word (VLIW) processor, a field-programmable gate array (FPGA), or other micro-controller) or can be conventional central processing units (CPUs) having one or more processing cores.

In addition, the simplified computing device 10 may also include other components, such as, for example, a communications interface 18. The simplified computing device 10 may also include one or more conventional computer input devices 20 (e.g., touchscreens, touch-sensitive surfaces, pointing devices, keyboards, audio input devices, voice or speech-based input and control devices, video input devices, haptic input devices, devices for receiving wired or wireless data transmissions, and the like) or any combination of such devices.

Similarly, various interactions with the simplified computing device 10 and with any other component or feature of wearable sensing, including input, output, control, feedback, and response to one or more users or other devices or systems associated with semantic entity relation detection classifier training, are enabled by a variety of Natural User Interface (NUI) scenarios. The NUI techniques and scenarios enabled by semantic entity relation detection classifier training include, but are not limited to, interface technologies that allow one or more users user to interact in a "natural" manner, free from artificial constraints imposed by input devices such as mice, keyboards, remote controls, and the like.

Such NUI implementations are enabled by the use of various techniques including, but not limited to, using NUI information derived from user speech or vocalizations captured via microphones or other sensors. Such NUI implementations are also enabled by the use of various techniques including, but not limited to, information derived from a user's facial expressions and from the positions, motions, or orientations of a user's hands, fingers, wrists, arms, legs, body, head, eyes, and the like, where such information may be captured using various types of 2D or depth imaging devices such as stereoscopic or time-of-flight camera systems, infrared camera systems, RGB (red, green and blue) camera systems, and the like, or any combination of such devices. Further examples of such NUI implementations include, but are not limited to, NUI information derived from touch and stylus recognition, gesture recognition (both onscreen and adjacent to the screen or display surface), air or contact-based gestures, user touch (on various surfaces, objects or other users), hover-based inputs or actions, and the like. Such NUI implementations may also include, but are not limited, the use of various predictive machine intelligence processes that evaluate current or past user behaviors, inputs, actions, etc., either alone or in combination with other NUI information, to predict information such as user intentions, desires, and/or goals. Regardless of the type or source of the NUI-based information, such information may then be used to initiate, terminate, or otherwise control or interact with one or more inputs, outputs, actions, or functional features of the semantic entity relation detection classifier training implementations described herein.

However, it should be understood that the aforementioned exemplary NUI scenarios may be further augmented by combining the use of artificial constraints or additional signals with any combination of NUI inputs. Such artificial constraints or additional signals may be imposed or generated by input devices such as mice, keyboards, and remote controls, or by a variety of remote or user worn devices such as accelerometers, electromyography (EMG) sensors for receiving myoelectric signals representative of electrical signals generated by user's muscles, heart-rate monitors, galvanic skin conduction sensors for measuring user perspiration, wearable or remote biosensors for measuring or otherwise sensing user brain activity or electric fields, wearable or remote biosensors for measuring user body temperature changes or differentials, and the like. Any such information derived from these types of artificial constraints or additional signals may be combined with any one or more NUI inputs to initiate, terminate, or otherwise control or interact with one or more inputs, outputs, actions, or functional features of the semantic entity relation detection classifier training implementations described herein.

The simplified computing device 10 may also include other optional components such as one or more conventional computer output devices 22 (e.g., display device(s) 24, audio output devices, video output devices, devices for transmitting wired or wireless data transmissions, and the like). Note that typical communications interfaces 18, input devices 20, output devices 22, and storage devices 26 for general-purpose computers are well known to those skilled in the art, and will not be described in detail herein.

The simplified computing device 10 shown in FIG. 19 may also include a variety of computer-readable media. Computer-readable media can be any available media that can be accessed by the computer 10 via storage devices 26, and can include both volatile and nonvolatile media that is either removable 28 and/or non-removable 30, for storage of information such as computer-readable or computer-executable instructions, data structures, program modules, or other data. Computer-readable media includes computer storage media and communication media. Computer storage media refers to tangible computer-readable or machine-readable media or storage devices such as digital versatile disks (DVDs), blu-ray discs (BD), compact discs (CDs), floppy disks, tape drives, hard drives, optical drives, solid state memory devices, random access memory (RAM), read-only memory (ROM), electrically erasable programmable read-only memory (EEPROM), CD-ROM or other optical disk storage, smart cards, flash memory (e.g., card, stick, and key drive), magnetic cassettes, magnetic tapes, magnetic disk storage, magnetic strips, or other magnetic storage devices. Further, a propagated signal is not included within the scope of computer-readable storage media.

Retention of information such as computer-readable or computer-executable instructions, data structures, program modules, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. Note that the terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, and/or computer program products embodying some or all of the various semantic entity relation detection classifier training implementations described herein, or portions thereof, may be stored, received, transmitted, or read from any desired combination of computer-readable or machine-readable media or storage devices and communication media in the form of computer-executable instructions or other data structures. Additionally, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, or media.

The semantic entity relation detection classifier training implementations described herein may be further described in the general context of computer-executable instructions, such as program modules, being executed by a computing device. Generally, program modules include routines, programs, objects, components, data structures, and the like, that perform particular tasks or implement particular abstract data types. The semantic entity relation detection classifier training implementations described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Additionally, the aforementioned instructions may be implemented, in part or in whole, as hardware logic circuits, which may or may not include a processor.

Alternatively, or in addition, the functionality described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), and so on.

3.0 Other Implementations

It is noted that any or all of the aforementioned implementations throughout the description may be used in any combination desired to form additional hybrid implementations. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What has been described above includes example implementations. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications, and variations that fall within the spirit and scope of the appended claims.

In regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the foregoing implementations include a system as well as a computer-readable storage media having computer-executable instructions for performing the acts and/or events of the various methods of the claimed subject matter.

There are multiple ways of realizing the foregoing implementations (such as an appropriate application programming interface (API), tool kit, driver code, operating system, control, standalone or downloadable software object, or the like), which enable applications and services to use the implementations described herein. The claimed subject matter contemplates this use from the standpoint of an API (or other software object), as well as from the standpoint of a software or hardware object that operates according to the implementations set forth herein. Thus, various implementations described herein may have aspects that are wholly in hardware, or partly in hardware and partly in software, or wholly in software.

The aforementioned systems have been described with respect to interaction between several components. It will be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (e.g., hierarchical components).

Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

4.0 Claim Support and Further Implementations

The following paragraphs summarize various examples of implementations which may be claimed in the present document. However, it should be understood that the implementations summarized below are not intended to limit the subject matter which may be claimed in view of the foregoing descriptions. Further, any or all of the implementations summarized below may be claimed in any desired combination with some or all of the implementations described throughout the foregoing description and any implementations illustrated in one or more of the figures, and any other implementations described below. In addition, it should be noted that the following implementations are intended to be understood in view of the foregoing description and figures described throughout this document.

In one implementation, a system is employed for training a semantic entity relation detection classifier. This system includes one or more computing devices, the computing devices being in communication with each other via a computer network whenever there is a plurality of computing devices. The system also includes a computer program having program modules executable by the one or more computing devices. The one or more computing devices are directed by the program modules of the computer program to receive a query click log and a knowledge graph, find queries included in the query click log that are associated with entities found in the knowledge graph, said entities being associated with a knowledge graph domain of interest, infer explicit relations from the found queries and generate an explicit relations data set comprising queries associated with the inferred explicit relations, infer implicit relations from the found queries and generate an implicit relations data set comprising queries associated with the inferred implicit relations, and train a semantic entity relation detection classifier using the explicit and implicit data sets to find an explicit or implicit relation, or both, in a query.

In one implementation of the system, the program module for finding queries included in the query click log that are associated with entities found in the knowledge graph, includes sub-modules for: identifying one or more central entity types in the knowledge graph which correspond to a domain of interest; for each identified central entity type, finding central type entities in the knowledge graph that correspond to the central entity type under consideration, establishing a central entity type property list for each of the found central type entities that comprises the found central type entity and other entities in the knowledge graph having a prescribed degree of relation to the central type entity under consideration, as well as the type of relation existing between the found central type entity and each of the other entities in the knowledge graph having a prescribed degree of relation to the central type entity under consideration, combining the central entity type property list established for the identified central entity types to produce a combined entity property list, and finding queries associated with entities listed in the combined entity property list in the query click log. In one version, the sub-module for finding queries associated with entities listed in the combined entity property list in the query click log, includes sub-modules for: identifying one or more relations of an entity in the combined entity property list each of which points to at least one URL in the knowledge graph; generating a list of the pointed to URLs; and finding queries in the query click log that are associated with at least one of the listed URLs. In another version, the system further includes a sub-module for, after queries associated with entities listed in the combined entity property list in the query click log are found, eliminating from consideration those found queries that are non-natural spoken language queries. This can involve employing a classifier that distinguishes natural language queries from non-natural spoken language queries. This can also involve retaining those found queries having stop words, or words that signal spoken queries, or both.

In one implementation of the system, the sub-module for finding queries associated with entities listed in the combined entity property list in the query click log, includes sub-modules for: creating a seed query from an entity in the combined entity property list; finding query click log queries that include the seed query; identifying uniform resource locators (URLs) from the query click log that are associated with at least one of the found queries; and finding other queries in the query click log that are associated with at least one of the identified URLs. In one version, the sub-module for finding queries associated with entities listed in the combined entity property list in the query click log, further includes a sub-module for eliminating the query click log queries found to include the seed query from consideration prior to identifying URLs that do not meet a prescribed length criteria, or quantity criteria, or both.

In one implementation of the system, an entity in the knowledge graph has said prescribed degree of relation to a central type entity whenever the entity is associated with an incoming relation from the central type entity, or is reachable in the knowledge graph from the central type entity within a prescribed number of relations. In one version, the prescribed number of relations is two.

In one implementation of the system, the program module for inferring explicit relations from the found queries and generating an explicit relations data set comprising queries associated with the inferred explicit relations, comprises sub-modules for: scanning the found queries to find those queries exhibiting an inferred explicit relation between entities wherein an inferred explicit relation between entities is defined as the presence of an entity and a closely related entity in the same query, and wherein an entity is closely related to another entity whenever the entity is connected to the another entity in the knowledge graph by no more than a prescribed number of intermediate entities; determining the types of relation exhibited by a pair of entities in each query exhibiting an inferred explicit relation; and generating an explicit relations data set comprising the text of queries associated with the inferred explicit relations as well as the type of relation assigned to each of the entities in the pair. In one version, the prescribed number of intermediate entities is one, such that entities that were directly connected to each other are considered closely related, as well as entities that are connected to another entity by no more than one intermediate entity. Further, in one version, the sub-module for scanning the found queries to find those queries exhibiting an inferred explicit relation between entities, comprises sub-modules for: determining if an entity associated with a found query is connected in the knowledge graph to another entity by a directed connector or path of connectors originating at the entity associated with a found query by no more than the prescribed number of intermediate entities; whenever the entity associated with the found query is connected in the knowledge graph to another entity by a directed connector or path of connectors originating at the entity associated with a found query by no more than the prescribed number of intermediate entities, determining if said other entity is also contained in the found query; and whenever said other entity is also contained in the found query, designating the found query as exhibiting an inferred explicit relation between the entities. This sub-module for determining if said other entity is also contained in the found query can include searching for the other entity approximate string matching methods. Still further, in one version, the sub-module for scanning the found queries to find those queries exhibiting an inferred explicit relation between entities, further comprises sub-modules for: for a query designated as exhibiting an inferred explicit relation between a pair of entities contained therein, identifying the relation label assigned to each connector connecting the pair of entities in the knowledge graph; determining the relation of said other entity of the entity pair based on the identify relation label or labels and assigning the determined relation to said other entity of the entity pair; and assigning the relation of the entity associated with a found query, if known, to that entity of the entity pair. Still further again, in one version, the sub-module for scanning the found queries to find those queries exhibiting an inferred explicit relation between entities, comprises sub-modules for: identifying an entity pair in the knowledge graph having a first entity of the pair that is connected to another entity of the pair by a directed connector or path of connectors originating at the first entity by no more than the prescribed number of intermediate entities, and whose connector or connectors connecting the pair of entities have relation label or labels that correspond to a semantic entity relation type associated with a domain of interest; determining if a found query contains the identified entity pair; and whenever the found query contains the identified entity pair, designating the found query as exhibiting an inferred explicit relation between the entities, assigning the semantic entity relation type associated with the domain of interest to said other entity of the entity pair, and assigning the relation of the first entity of the pair, if known, to that entity. Here again, determining if a found query contains the identified entity pair can include employing approximate string matching methods.

In one implementation, another system is employed for training a semantic entity relation detection classifier. This system includes one or more computing devices, the computing devices being in communication with each other via a computer network whenever there is a plurality of computing devices. The system also includes a computer program having program modules executable by the one or more computing devices. The one or more computing devices are directed by the program modules of the computer program to receive a query click log and a knowledge graph, find queries included in the query click log that are associated with entities found in the knowledge graph, said entities being associated with a knowledge graph domain of interest, infer implicit relations from the found queries and generate an implicit relations data set comprising queries associated with the inferred implicit relations, and train a semantic entity relation detection classifier using at least the implicit data set to find a relation in a query.

In one implementation of this other system, the program module for finding queries included in the query click log that are associated with entities found in the knowledge graph, comprises sub-modules for: identifying one or more central entity types in the knowledge graph which correspond to a domain of interest; for each identified central entity type, finding central type entities in the knowledge graph that correspond to the central entity type under consideration, establishing a central entity type property list for each of the found central type entities that comprises the found central type entity and other entities in the knowledge graph having a prescribed degree of relation to the central type entity under consideration, as well as the type of relation existing between the found central type entity and each of the other entities in the knowledge graph having a prescribed degree of relation to the central type entity under consideration, combining the central entity type property list established for the identified central entity type types to produce a combined entity property list, and finding queries associated with entities listed in the combined entity property list in the query click log. In one version, the program module for inferring implicit relations from the found queries and generating an implicit relations data set comprising queries associated with the inferred implicit relations, comprises sub-modules for: for each of one or more of the found queries, using the query click log to identify from a found query the URL associated with a result presented from a search of the query that was selected by a user, determining if an entity associated with the identified URL is found in the query, wherein an entity is associated with a URL if the entity points to that URL in the knowledge graph, whenever the entity associated with the identified URL is not found in the query, using said combined entity property list to identify a central entity type related to the entity associated with the identified URL and what type of relation exists between that central entity type and the entity associated with the identified URL, and inferring the existence of an implicit relation from the found query and assigning the identified relation type to the entity associated with the identified URL; and generating an implicit relations data set having entries each of which comprises the text of a query associated with an inferred implicit relation as well as the type of relation assigned to the entity associated with the URL indentified from that query. In another version, the program module for inferring implicit relations from the found queries and generating an implicit relations data set comprising queries associated with the inferred implicit relations, comprises sub-modules for: for each of one or more of the found queries, using the query click log to identify from a found query the URL associated with a result presented from a search of the query that was selected by a user, determining if an entity associated with the identified URL is found in the query, wherein an entity is associated with a URL if the entity points to that URL in the knowledge graph, whenever the entity associated with the identified URL is not found in the query, using said combined entity property list to identify a central entity type related to the entity associated with the identified URL and determining if the identified the central entity type is found in the query, whenever the identified the central entity type is found in the query, identifying what type of relation exists between that central entity type and the entity associated with the identified URL, and inferring the existence of an implicit relation from the found query and assigning the identified relation type to the entity associated with the identified URL; and generating an implicit relations data set having entries each of which comprises the text of a query associated with an inferred implicit relation as well as the type of relation assigned to the entity associated with the URL indentified from that query.

In one implementation of this other system, the program module for inferring implicit relations from the found queries and generating an implicit relations data set comprising queries associated with the inferred implicit relations, comprises sub-modules for: identifying, for one or more semantic entity relation types associated with a domain of interest, at least one entity pair in the knowledge graph having a first entity of the pair that is connected to another entity of the pair by a directed connector or path of connectors originating at the first entity by no more than the prescribed number of intermediate entities, and whose connector or connectors connecting the pair of entities have a relation label or labels that correspond to the semantic entity relation type associated with a domain of interest; determining, for each entity pair identified, if a found query contains the first entity of the pair, but not the other entity of the pair, whenever the found query contains the first entity of the pair, but not the other entity of the pair, using the query click log to identify from the found query the URL associated with a result presented from a search based on the query that was selected by a user, and determining if the other entity of the pair is associated with the identified URL, wherein an entity is associated with a URL if the entity points to that URL in the knowledge graph, whenever the other entity of the pair is associated with the identified URL, designating the found query infers an implicit relation, and assigning the semantic entity relation type associated with the domain of interest to said other entity of the entity pair, and assigning the relation of the first entity of the pair, if known, to that entity; and generating an implicit relations data set having entries each of which comprises the text of a query associated with an inferred implicit relation as well as the type of relation assigned to the first entity of an entity pair associated with the query and the type of relation assigned to said other entity of the entity pair.

In one implementation of this other system, the program module for inferring implicit relations from the found queries and generating an implicit relations data set comprising queries associated with the inferred implicit relations, comprises sub-modules for: identifying, for one or more semantic entity relation types associated with a domain of interest, those found queries having the name of the relation type or a variation thereof contained therein, and at least one entity pair in the knowledge graph having a first entity of the pair that is connected to another entity of the pair by a directed connector or path of connectors originating at the first entity by no more than the prescribed number of intermediate entities, and whose connector or connectors connecting the pair of entities have a relation label or labels that correspond to the semantic entity relation type; determining, for each entity pair identified and each found query identified, if the query contains the first entity of the pair, but not the other entity of the pair, whenever the found query contains the first entity of the pair, but not the other entity of the pair, designating the found query infers an implicit relation, and assigning the semantic entity relation type associated with the domain of interest to said other entity of the entity pair, and assigning the relation of the first entity of the pair, if known, to that entity; and generating an implicit relations data set having entries each of which comprises the text of a query associated with an inferred implicit relation as well as the type of relation assigned to the first entity of an entity pair associated with the query and the type of relation assigned to said other entity of the entity pair.

In one implementation of this other system, it further includes a program module for inferring explicit relations from the found queries and generating an explicit relations data set comprising queries associated with the inferred explicit relations, and wherein the program module for training the semantic entity relation detection classifier comprises training the semantic entity relation detection classifier using the explicit and implicit data sets to find an explicit or implicit relation, or both, in a query.

In one implementation, yet another system is employed for training a semantic entity relation detection classifier. This system includes one or more computing devices, the computing devices being in communication with each other via a computer network whenever there is a plurality of computing devices. The system also includes a computer program having program modules executable by the one or more computing devices. The one or more computing devices are directed by the program modules of the computer program to receive a query click log and a knowledge graph, find queries included in the query click log that are associated with entities found in the knowledge graph, said entities being associated with a knowledge graph domain of interest, infer explicit relations from the found queries and generate an explicit relations data set comprising queries associated with the inferred explicit relations, infer implicit relations from the found queries and generate an implicit relations data set comprising queries associated with the inferred implicit relations, train a first classifier using the implicit relations data set to produce an implicit relations classifier that can find implicit relations in a query, apply the implicit relations classifier to each of the queries in the explicit relations data set to find queries predicted to have an implicit relation or implicit relations, augment the explicit relations data set, said augmenting comprising, for each query in the explicit relations data set predicted to have an implicit relation or implicit relations, adding the implicit relation or implicit relations predicted for that query to the explicit relations data set entry associated with the query to produce an augmented explicit relations data set, and train a second classifier using the augmented explicit relations data set to produce a combined relations classifier that can find explicit, or implicit relations, or both, in a query.

In one implementation, a computer-implemented process is employed for training a semantic entity relation detection classifier, which includes using a computing device to perform the following process actions: receiving a query click log and a knowledge graph; finding queries included in the query click log that are associated with entities found in the knowledge graph, said entities being associated with a knowledge graph domain of interest; inferring explicit relations from the found queries and generating an explicit relations data set comprising queries associated with the inferred explicit relations; inferring implicit relations from the found queries and generating an implicit relations data set comprising queries associated with the inferred implicit relations; and training a semantic entity relation detection classifier using the explicit and implicit data sets to find an explicit or implicit relation, or both, in a query.

In one implementation, a computer-implemented process is employed for training a semantic entity relation detection classifier, which includes using a computing device to perform the following process actions: receiving a query click log and a knowledge graph; finding queries included in the query click log that are associated with entities found in the knowledge graph, said entities being associated with a knowledge graph domain of interest; inferring implicit relations from the found queries and generating an implicit relations data set comprising queries associated with the inferred implicit relations; and training a semantic entity relation detection classifier using the implicit data set to find an implicit relation in a query.

Wherefore, what is claimed is:

1. An apparatus comprising one or more computing devices, said computing devices being in communication with each other via a computer network whenever there is a plurality of computing devices, the apparatus comprising:
   a processor and memory storing instructions executable by the processor to implement
   a computer program having program modules to direct the one or more computing devices to,
   receive a query click log and a knowledge graph,
   find queries included in the query click log that are associated with entities found in the knowledge graph, said entities being associated with a knowledge graph domain of interest,
   use the knowledge graph to identify explicit relations from the found queries,
   based on identifying the explicit relations from the found queries, generate an explicit relations data set comprising queries associated with the identified explicit relations,
   use the knowledge graph to identify implicit relations from the found queries,
   based on identifying the implicit relations from the found queries, generate an implicit relations data set comprising queries associated with the identified implicit relations, and
   train a semantic entity relation detection classifier using the explicit and implicit data sets to find an explicit or implicit relation, or both, in a query, the found explicit or implicit relation, or the found explicit and implicit relations, being utilized to automatically generate an appropriate response to the query whenever it is input to said trained classifier.

2. The system of claim 1, wherein the program module for finding queries included in the query click log that are associated with entities found in the knowledge graph, comprises sub-modules for:
   identifying one or more central entity types in the knowledge graph which correspond to a domain of interest;
   for each identified central entity type,
      finding central type entities in the knowledge graph that correspond to the central entity type under consideration,
      establishing a central entity type property list for each of the found central type entities that comprises the found central type entity and other entities in the knowledge graph having a prescribed degree of relation to the central type entity under consideration, as well as a type of relation existing between the found central type entity and each of the other entities in the knowledge graph having the prescribed degree of relation to the central type entity under consideration,
      combining the central entity type property list established for the identified central entity types to produce a combined entity property list, and finding queries associated with entities listed in the combined entity property list in the query click log.

3. The system of claim 2, wherein the sub-module for finding queries associated with entities listed in the combined entity property list in the query click log, comprises sub-modules for:
   creating a seed query from an entity in the combined entity property list;
   finding query click log queries that include the seed query;
   identifying uniform resource locators (URLs) from the query click log that are associated with at least one of the found queries; and
   finding other queries in the query click log that are associated with at least one of the identified URLs.

4. The system of claim 3, wherein the sub-module for finding queries associated with entities listed in the combined entity property list in the query click log, further comprises a sub-module for eliminating the query click log queries found to include the seed query from consideration prior to identifying URLs that do not meet a prescribed length criteria, or quantity criteria, or both.

5. The system of claim 2, wherein the sub-module for finding queries associated with entities listed in the combined entity property list in the query click log, comprises sub-modules for:
   identifying one or more relations of an entity in the combined entity property list each of which points to at least one URL in the knowledge graph;
   generating a list of the pointed to URLs; and
   finding queries in the query click log that are associated with at least one of the listed URLs.

6. The system of claim 2, further comprising a sub-module for, after queries associated with entities listed in the combined entity property list in the query click log are found, eliminating from consideration those found queries that are non-natural spoken language queries.

7. The system of claim 2, wherein an entity in the knowledge graph has said prescribed degree of relation to the central type entity whenever the entity is associated with an incoming relation from the central type entity, or is reachable in the knowledge graph from the central type entity within a prescribed number of relations.

8. The system of claim 1, wherein the program module for identifying explicit relations from the found queries and generating the explicit relations data set comprising queries associated with the identified explicit relations, comprises sub-modules for:
   scanning the found queries to find those queries exhibiting an identified explicit relation between entities wherein the identified explicit relation between entities is defined as a presence of an entity and a closely related entity in a same query, and wherein the entity is closely related to another entity whenever the entity is connected to the another entity in the knowledge graph by no more than a prescribed number of intermediate entities;
   determining a type of relation exhibited by a pair of entities in each query exhibiting the identified explicit relation; and
   generating the explicit relations data set comprising text of queries associated with the identified explicit relations as well as the type of relation assigned to each of the entities in the pair.

9. The system of claim 8, wherein said prescribed number of intermediate entities is one, such that entities that were directly connected to each other are considered closely related, as well as entities that are connected to another entity by no more than one intermediate entity.

10. The system of claim 8, wherein the sub-module for scanning the found queries to find those queries exhibiting the identified explicit relation between entities, comprises sub-modules for:
    determining if an entity associated with a found query is connected in the knowledge graph to another entity by a directed connector or path of connectors originating at the entity associated with the found query by no more than the prescribed number of intermediate entities;
    whenever the entity associated with the found query is connected in the knowledge graph to another entity by the directed connector or path of connectors originating at the entity associated with the found query by no more than the prescribed number of intermediate entities, determining if said other entity is also contained in the found query; and
    whenever said other entity is also contained in the found query, designating the found query as exhibiting the identified explicit relation between the entities.

11. The system of claim 10, wherein the sub-module for scanning the found queries to find those queries exhibiting the identified explicit relation between entities, further comprises sub-modules for:
    for a found query designated as exhibiting the identified explicit relation between the pair of entities contained therein, identifying a relation label assigned to each connector connecting the pair of entities in the knowledge graph;
    determining the relation of said other entity of the entity pair based on the relation label or labels identified and assigning the relation to said other entity of the entity pair; and
    assigning the relation of the entity associated with the found query, if known, to that entity of the entity pair.

12. The system of claim 8, wherein the sub-module for scanning the found queries to find those queries exhibiting the identified explicit relation between entities, comprises sub-modules for:
    identifying an entity pair in the knowledge graph having a first entity of the pair that is connected to another entity of the pair by a directed connector or path of connectors originating at the first entity by no more than the prescribed number of intermediate entities, and whose connector or connectors connecting the pair of entities have relation label or labels that correspond to a semantic entity relation type associated with a domain of interest;
    determining if a found query contains the identified entity pair; and
    whenever the found query contains the identified entity pair,
      designating the found query as exhibiting the identified explicit relation between the entities,
      assigning the semantic entity relation type associated with the domain of interest to said other entity of the entity pair, and
      assigning the relation of the first entity of the pair, if known, to that entity.

13. An apparatus comprising one or more computing devices, said computing devices being in communication with each other via a computer network whenever there is a plurality of computing devices, the apparatus comprising:
    a processor and memory storing instructions executable by the processor to implement a computer program having program modules to direct the one or more computing devices to,
receive a query click log and a knowledge graph,
find queries included in the query click log that are associated with entities found in the knowledge graph, said entities being associated with a knowledge graph domain of interest,
use the knowledge graph to identify implicit relations from the found queries,
based on identifying the implicit relations from the found queries, generate an implicit relations data set comprising queries associated with the identified implicit relations, and
train a semantic entity relation detection classifier using at least the implicit data set to find a relation in a query, said found relation being utilized to automatically generate an appropriate response to the query whenever it is input to said trained classifier.

14. The system of claim 13, wherein the program module for finding queries included in the query click log that are associated with entities found in the knowledge graph, comprises sub-modules for:
identifying one or more central entity types in the knowledge graph which correspond to a domain of interest;
for each identified central entity type,
finding central type entities in the knowledge graph that correspond to the central entity type under consideration,
establishing a central entity type property list for each of the found central type entities that comprises the found central type entity and other entities in the knowledge graph having a prescribed degree of relation to the central type entity under consideration, as well as a type of relation existing between the found central type entity and each of the other entities in the knowledge graph having the prescribed degree of relation to the central type entity under consideration,
combining the central entity type property list established for the identified central entity types to produce a combined entity property list, and
finding queries associated with entities listed in the combined entity property list in the query click log.

15. The system of claim 14, wherein the program module for identifying implicit relations from the found queries and generating the implicit relations data set comprising queries associated with the identified implicit relations, comprises sub-modules for:
for each of one or more of the found queries,
using the query click log to identify from a found query a URL associated with a result presented from a search of the query that was selected by a user,
determining if an entity associated with the URL is found in the query, wherein the entity is associated with the URL if the entity points to the URL in the knowledge graph,
whenever the entity associated with the URL is not found in the query, using said combined entity property list to identify the central entity type related to the entity associated with the URL and what type of relation exists between that central entity type and the entity associated with the identified URL, and
identifying existence of an implicit relation from the found query and assigning the identified relation type to the entity associated with the URL; and
generating the implicit relations data set having entries each of which comprises text of the query associated with the identified implicit relation as well as the type of relation assigned to the entity associated with the URL identified from that query.

16. The system of claim 14, wherein the program module for identifying implicit relations from the found queries and generating the implicit relations data set comprising queries associated with the identified implicit relations, comprises sub-modules for:
for each of one or more of the found queries,
using the query click log to identify from a found query a URL associated with a result presented from a search of the query that was selected by a user,
determining if an entity associated with the URL is found in the query, wherein the entity is associated with the URL if the entity points to that URL in the knowledge graph,
whenever the entity associated with the URL is not found in the query, using said combined entity property list to identify the central entity type related to the entity associated with the URL and determining if the identified central entity type is found in the query,
whenever the identified central entity type is found in the query, identifying what type of relation exists between that central entity type and the entity associated with the URL, and
identifying existence of an implicit relation from the found query and assigning the identified relation type to the entity associated with the URL; and
generating the implicit relations data set having entries each of which comprises text of the query associated with the identified implicit relation as well as the type of relation assigned to the entity associated with the URL identified from that query.

17. The system of claim 13, wherein the program module for identifying implicit relations from the found queries and generating the implicit relations data set comprising queries associated with the identified implicit relations, comprises sub-modules for:
identifying, for one or more semantic entity relation types associated with a domain of interest, at least one entity pair in the knowledge graph having a first entity of the pair that is connected to another entity of the pair by a directed connector or path of connectors originating at the first entity by no more than the prescribed number of intermediate entities, and whose connector or connectors connecting the pair of entities have a relation label or labels that correspond to the semantic entity relation type associated with a domain of interest;
determining, for each entity pair identified, if a found query contains the first entity of the pair, but not the other entity of the pair,
whenever the found query contains the first entity of the pair, but not the other entity of the pair,
using the query click log to identify from the found query a URL associated with a result presented from a search based on the query that was selected by a user, and
determining if the other entity of the pair is associated with the URL, wherein the entity is associated with the URL if the entity points to that URL in the knowledge graph,
whenever the other entity of the pair is associated with the URL,
designating the found query as identifying an implicit relation, and assigning the semantic entity relation type associated with the domain of interest to said other entity of the entity pair, and assigning the relation of the first entity of the pair, if known, to that entity; and generating the implicit relations data set having entries each of which comprises text of a query associated with the identified implicit relation as well as the type of relation assigned to the first entity of the entity pair associated with the query and the type of relation assigned to said other entity of the entity pair.

18. The system of claim 13, wherein the program module for identifying implicit relations from the found queries and generating the implicit relations data set comprising queries associated with the identified implicit relations, comprises sub-modules for:

identifying, for one or more semantic entity relation types associated with a domain of interest, those found queries having a name of the relation type or a variation thereof contained therein, and at least one entity pair in the knowledge graph having a first entity of the pair that is connected to another entity of the pair by a directed connector or path of connectors originating at the first entity by no more than the prescribed number of intermediate entities, and whose connector or connectors connecting the pair of entities have a relation label or labels that correspond to the semantic entity relation type;

determining, for each entity pair identified and each found query identified, if the query contains the first entity of the pair, but not the other entity of the pair, whenever the found query contains the first entity of the pair, but not the other entity of the pair, designating the found query as identifying an implicit relation, and assigning the semantic entity relation type associated with the domain of interest to said other entity of the entity pair, and assigning the relation of the first entity of the pair, if known, to that entity; and generating the implicit relations data set having entries each of which comprises text of a query associated with the identified implicit relation as well as the type of relation assigned to the first entity of the entity pair associated with the query and the type of relation assigned to said other entity of the entity pair.

19. The system of claim 13, further comprising a program module for identifying explicit relations from the found queries and generating an explicit relations data set comprising queries associated with the identified explicit relations, and wherein the program module for training the semantic entity relation detection classifier comprises training the semantic entity relation detection classifier using the explicit and implicit data sets to find an explicit or implicit relation, or both, in a query.

20. An apparatus comprising one or more computing devices, said computing devices being in communication with each other via a computer network whenever there is a plurality of computing devices, the apparatus comprising:

a processor and memory storing instructions executable by the processor to implement a computer program having program modules to direct the one or more computing devices to, receive a query click log and a knowledge graph, find queries included in the query click log that are associated with entities found in the knowledge graph, said entities being associated with a knowledge graph domain of interest, use the knowledge graph to identify explicit relations from the found queries, based on identifying the explicit relations from the found queries, generate an explicit relations data set comprising queries associated with the identified explicit relations, use the knowledge graph to identify implicit relations from the found queries, based on identifying the implicit relations from the found queries, generate an implicit relations data set comprising queries associated with the identified implicit relations, train a first classifier using the implicit relations data set to produce an implicit relations classifier that can find implicit relations in a query, apply the implicit relations classifier to each of the queries in the explicit relations data set to find queries predicted to have an implicit relation or implicit relations, augment the explicit relations data set, said augmenting comprising, for each query in the explicit relations data set predicted to have the implicit relation or implicit relations, adding the implicit relation or implicit relations predicted for that query to the explicit relations data set entry associated with the query to produce an augmented explicit relations data set, and train a second classifier using the augmented explicit relations data set to produce a combined relations classifier that can find explicit, or implicit relations, or both, in the query, the found explicit or implicit relations, or the found explicit and implicit relations, being utilized to automatically generate an appropriate response to the query whenever it is input to the combined relations classifier.

* * * * *